(12) United States Patent
Kamo

(10) Patent No.: US 7,633,688 B2
(45) Date of Patent: Dec. 15, 2009

(54) IMAGE FORMING OPTICAL SYSTEM

(75) Inventor: Yuji Kamo, Hino (JP)

(73) Assignee: Olympus Imaging Corp., Tokyo (JP)

( * ) Notice: Subject to any disclaimer, the term of this patent is extended or adjusted under 35 U.S.C. 154(b) by 474 days.

(21) Appl. No.: 11/442,154

(22) Filed: May 30, 2006

(65) Prior Publication Data
US 2006/0274433 A1 Dec. 7, 2006

(30) Foreign Application Priority Data
Jun. 1, 2005 (JP) ............................. 2005-161886
Jun. 1, 2005 (JP) ............................. 2005-161887

(51) Int. Cl.
G02B 3/02 (2006.01)
G02B 9/08 (2006.01)
G02B 9/62 (2006.01)

(52) U.S. Cl. ...................... 359/717; 359/740; 359/749; 359/753; 359/761; 359/762

(58) Field of Classification Search ................. 359/717, 359/740, 749, 753, 761, 762
See application file for complete search history.

(56) References Cited

U.S. PATENT DOCUMENTS
5,311,363 A * 5/1994 Ono et al. .................... 359/753

FOREIGN PATENT DOCUMENTS

| JP | 51-002826 | 1/1976 |
|---|---|---|
| JP | 51-014017 | 5/1976 |
| JP | 04-068307 | 3/1992 |
| JP | 05-264897 | 10/1993 |
| JP | 2000-352665 A | 12/2000 |
| JP | 2001-281540 A | 10/2001 |
| JP | 2002-072085 A | 3/2002 |
| JP | 2004-317866 A | 11/2004 |

* cited by examiner

Primary Examiner—Evelyn A. Lester
(74) Attorney, Agent, or Firm—Kenyon & Kenyon LLP

(57) ABSTRACT

An image forming optical system which comprises a negative lens unit and a positive lens unit arranged in order from an object side. The negative lens unit includes, in order from the object side, a first negative lens and a second negative lens, or a first negative lens, a second negative lens and a third negative lens. The positive lens unit includes, in order from the object side, a third positive lens, a fourth negative lens, a fifth positive lens and a sixth positive lens, or a fourth positive lens, a fifth negative lens, a sixth positive lens and a seventh positive lens.

31 Claims, 17 Drawing Sheets

IMAGE FORMING OPTICAL SYSTEM

CROSS REFERENCE TO RELATED APPLICATIONS

This application claims benefit under 35 U.S.C. § 119 of Japanese patent applications of No. 2005-161,886, filed in Japan on Jun. 1, 2005 and No. 2005-161,887, filed in Japan on Jun. 1, 2005, the contents of which are incorporated herein by reference.

BACKGROUND OF THE INVENTION

1. Field of the Invention

The present invention relates to an image forming optical system being suitable for use with an image pickup apparatus.

2. Description of the Related Art

The equipping of automobiles with vehicular mounted cameras has begun to spread. At first, vehicular mounted cameras were employed mainly as monitors to provide visual confirmation. Recently, however, vehicular mounted cameras have begun to be employed as high performance sensing cameras, used, for example, for detecting white lines on roads, for performing monitoring to prevent cross-lane veering, for detecting obstacles and for observing drivers and their performance. As a result, there is a growing demand for a reduced size vehicular mounted camera, manufactured at low cost, that provides a wide angle of view, i.e., which completely eliminates blind spots, by employing a fisheye optical system, for which only a small number of lenses is required, that has a half angle of view equal to or greater than 90° and a high image quality.

Examples of the fisheye optical system, constituted by a small number of lenses, are described in Japanese Patent No. 2,992,547 and Japanese Patent Laid-Open Application No. 2002-72,085. Six lenses are employed for each of these optical systems. Other examples of a wide-angle optical system composed of six lenses are described in Japanese Patent Laid-Open Application No. Hei 5-264,897, No. 2000-352,665, No. 2001-281,540 and No. 2004-317,866.

Further, an example of an optical system composed of seven lenses is described in example 12 in Japanese Patent Laid-Open Application No. 2000-352,665.

Furthermore, examples of fisheye optical system having a half angle of view exceeding 90° are described in Japanese Patent Publications (Kokoku) No. Sho 51-14,017 and No. Sho 51-2,826.

BRIEF SUMMARY OF THE INVENTION

The present invention provides an image forming optical system that is suitable to be employed for an image pickup apparatus.

According to the invention, an image forming optical system of a first type includes a lens unit having a negative refractive power and a lens unit having a positive refractive power, which are arranged in order from an object side, wherein the lens unit having the negative refractive power comprises, in order from the object side, a first lens, which is a negative lens, and a second lens, which is a negative lens, wherein the lens unit having the positive refractive power comprises, in order from the object side, a third lens, which is a positive lens, a fourth lens, which is a negative lens, a fifth lens, which is a positive lens, and a sixth lens, which is a positive lens, and wherein the second lens is a biconcave negative lens and the sixth lens is a biconvex positive lens.

An image forming optical system of a second type of this invention includes a lens unit having a negative refractive power and a lens unit having a positive refractive power, which are arranged in order from an object side, wherein the lens unit having the negative refractive power comprises, in order from the object side, a first lens, which is a negative lens and a second lens, which is a negative lens, wherein the lens unit having the positive refractive power comprises, in order from the object side, a third lens, which is a positive lens, a fourth lens, which is a negative lens, a fifth lens, which is a positive lens, and a sixth lens, which is a positive lens, and wherein the following conditions (1A) and (2A) are satisfied:

$$-1.2 \leq fN/Ih \leq -0.5 \tag{1A}$$

$$0.85 \leq f1/f2 \leq 1.5 \tag{2A}$$

where f1 denotes a focal length of the first lens, f2 denotes a focal length of the second lens, fN denotes a focal length of the lens unit having the negative refractive power, and Ih denotes a maximum image height.

An image forming optical system of a third type of this invention includes a lens unit having a negative refractive power and a lens unit having a positive refractive power, which are arranged in order from an object side, wherein the lens unit having the negative refractive power comprises, in order from the object side, a first lens, which is a negative lens, and a second lens, which is a negative lens, wherein the lens unit having the positive refractive power comprises, in order from the object side, a third lens, which is a positive lens, a fourth lens, which is a negative lens, a fifth lens, which is a positive lens, and a sixth lens, which is a positive lens, and wherein the following condition (3A) is satisfied:

$$2.1 \leq f5/f \leq 4 \tag{3A}$$

where f5 denotes a focal length of the fifth lens, and f denotes a focal length of the entire image forming optical system.

An image forming optical system of a fourth type of this invention includes a lens unit having a negative refractive power and a lens unit having a positive refractive power, which are arranged in order from an object side, wherein the lens unit having the negative refractive power comprises, in order from an object side, a first lens, which is a negative lens, and a second lens, which is a negative lens, wherein the lens unit having the positive refractive power comprises, in order from the object side, a third lens, which is a positive lens, a fourth lens, which is a negative lens, a fifth lens, which is a positive lens, and a sixth lens, which is a positive lens, and an aperture stop that is located between the third lens and the fourth lens, and wherein the following condition (4A) is satisfied $$0.7 \leq d3S/Ih \leq 2 \tag{4A}$$

where d3S denotes an axial space from an image side surface of the third lens to the aperture stop, and Ih denotes a maximum image height.

An image forming optical system of a fifth type of this invention includes a lens unit having a negative refractive power and a lens unit having a positive refractive power, which are arranged in order from an object side, wherein the lens unit having the negative refractive power comprises, in order from the object side, a first lens, which is a negative lens, and a second lens, which is a negative lens, wherein the lens unit having the positive refractive power comprises, in order from the object side, a third lens, which is a positive lens, a fourth lens, which is a negative lens, a fifth lens, which is a positive lens, and a sixth lens, which is a positive lens, and wherein the following condition (5A) is satisfied $$-0.35 \leq fN/fP \leq -0.1 \tag{5A}$$

where fN denotes a focal length of the lens unit of the negative refractive power, and fP is a focal length of the lens unit having the positive refractive power.

An image forming optical system of a sixth type of the invention includes a lens unit having a negative refractive power and a lens unit having a positive refractive power, which are arranged in order from an object side, wherein the lens unit having the negative refractive power comprises, in order from the object side, a first lens, which is a negative lens, a second lens, which is a negative lens, and a third lens, which is a negative lens, wherein the lens unit having the positive refractive power comprises, in order from the object side, a fourth lens, which is a positive lens, a fifth lens, which is a negative lens, a sixth lens, which is a positive lens, and a seventh lens, which is a positive lens, and wherein the third lens is a biconcave negative lens.

An image forming optical system of a seventh type of this invention includes a lens unit having a negative refractive power and a lens unit having a positive refractive power, which are arranged in order from an object side, wherein the lens unit having the negative refractive power comprises, in order from the object side, a first lens, which is a negative lens, a second lens, which is a negative lens, and a third lens, which is a negative lens, wherein the lens unit having the positive refractive power comprises, in order from the object side, a fourth lens, which is a positive lens, a fifth lens, which is a negative lens, a sixth lens, which is a positive lens, and a seventh lens, which is a positive lens, and wherein a composite focal length of the fifth lens and the sixth lens is positive.

An image forming optical system of an eighth type of this invention includes a lens unit having a negative refractive power and a lens unit having a positive refractive power, which are arranged in order from an object side, wherein the lens unit having the negative refractive power comprises, in order from the object side, a first lens, which is a negative lens, a second lens, which is a negative lens, and a third lens, which is a negative lens, wherein the lens unit having the positive refractive power comprises, in order from the object side, a fourth lens, which is a positive lens, a fifth lens, which is a negative lens, a sixth lens, which is a positive lens, and a seventh lens, which is a positive lens, and an aperture stop is arranged between the fourth lens and the fifth lens, and wherein the following condition (1B) is satisfied $$0.3 \leq d4S/Ih \leq 2.5 \tag{1B}$$

where d4S denotes an axial space from an image side surface of the fourth lens to the aperture space, and Ih denotes a maximum image height.

An image forming optical system of a ninth type of this invention includes a lens unit having a negative refractive power and a lens unit having a positive refractive power, which are arranged in order from an object side, wherein the lens unit having the negative refractive power comprises, in order from the object side, a first lens, which is a negative lens, a second lens, which is a negative lens, and a third lens, which is a negative lens, wherein the lens unit having the positive refractive power comprises, in order from the object side, a fourth lens, which is a positive lens, a fifth lens, which is a negative lens, a sixth lens, which is a positive lens, and a seventh lens, which is a positive lens, and wherein the following condition (2B) is satisfied $$-0.7 \leq fN/fP \leq -0.05 \tag{2B}$$

where fN denotes a focal length of the lens unit having the negative refractive power, and fP denotes a focal length of the lens unit of the positive refractive power.

DETAILED DESCRIPTION

Figure 1:
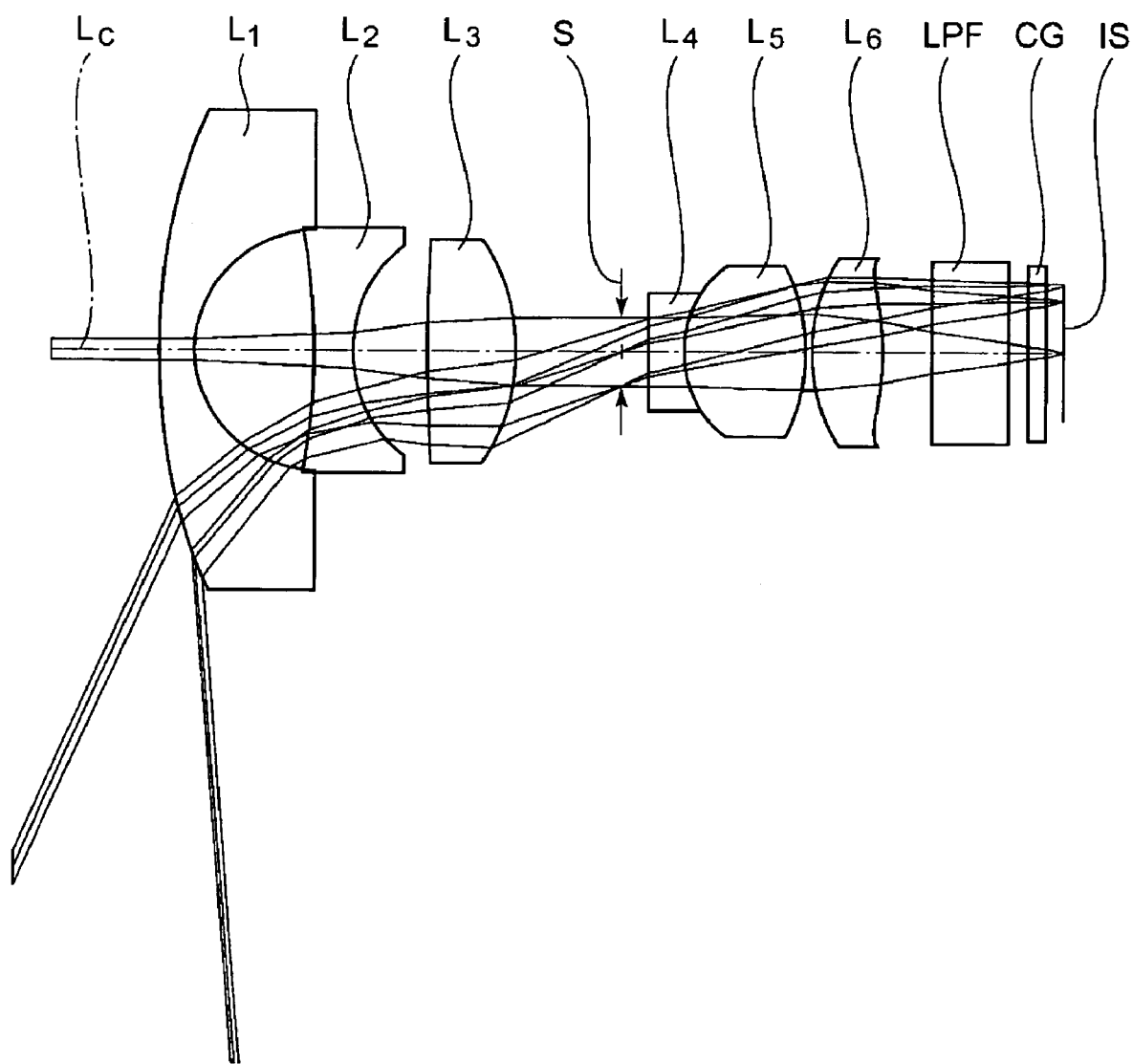
FIG. 1 is a cross-sectional view of example 1 of the present invention, taken along a surface including an optical axis.

Image forming optical systems of the first to fifth types will now be described.

Generally, a retrofocus type optical system is employed for a wide-angle optical system, which comprises, in order from an object side, a lens unit having a negative refractive power and a lens unit having a positive refractive power. When this optical system is employed for constituting an optical system having a super-wide half angle of view of about 90°, focal length must be reduced. So, the negative refractive power of the lens unit having a negative refractive power should be increased, and the principal point should be shifted to the image forming surface side. Further, in order to correct the aberration that occurs due to this arrangement, the lens unit having the positive refractive power should be appropriately formed.

Therefore, in this invention, the following arrangement is employed as a basic arrangement for the image forming optical system. That is, the image forming optical system comprises a lens unit having a negative refractive power and a lens unit having a positive refractive power, which are arranged in order from the object side. The lens unit having the negative refractive power comprises, in order from the object side, a first lens, which is a negative lens, and a second lens, which is a negative lens. The lens unit having the positive refractive power comprises, in order from the object side, a third lens, which is a positive lens, a fourth lens, which is a negative lens, a fifth lens, which is a positive lens, and a sixth lens, which is a positive lens.

With this basic arrangement, an axial light flux that is diverged by the lens unit having the negative refractive power, is converged by the lens unit having the positive refractive power. At this time, when the degree of convergence of the axial light flux effected by the lens unit having the positive refractive power is higher, a wider angle of view can be obtained.

In the structure of a normal retrofocus type image forming optical system, a chromatic aberration of magnification tends to occur. Therefore, generally, a material having an appropriate Abbe number is selected for each lens to correct the chromatic aberration of magnification. However, in the image forming optical system having a super-wide angle of view, the height of the off-axial chief ray incident to the peripheral portion of the image, which is closely related to the occurrence of the chromatic aberration of magnification, becomes high, and, the chromatic aberration of magnification due to the great height of ray significantly affects the performance of the image forming optical system. Therefore, the correction of the aberration can not be fully performed simply by selecting appropriate Abbe numbers.

Thus, the image forming optical system of the first type is so constituted, in the basic arrangement, that the second lens is formed as a biconcave negative lens and the sixth lens is formed as a biconcave positive lens.

In order to prevent the occurrence of the chromatic aberration of magnification, reduction in the height of the off-axial chief ray, incident to the peripheral portion of the image, is effective. Therefore, the entrance pupil position is appropriately set, and in order to lower the height of the off-axial chief ray, incident to the peripheral portion, as the second lens, which is one of the lenses included in the lens unit having the negative refractive power, a biconcave shaped lens is used. When the second lens is thus shaped, the entrance pupil position can be shifted to the object side, and the chromatic aberration of magnification can be effectively corrected. Furthermore, when the height of the off-axial chief ray, incident to the peripheral portion, is reduced, the diameters of the first and the second lenses, which are negative lenses, can be reduced, and the volumes of the lenses can be reduced. As a result, the manufacturing costs for the lenses can be reduced, while at the same time, reductions in the size and the weight of the optical system can also be achieved.

Further, astigmatism and coma that occur in the lens unit arranged on the object side, that has the negative refractive power, should be appropriately corrected by the lens unit having a positive refractive power and arranged closer to the image forming surface side than the lens unit having the negative refractive power. Since astigmatism and coma are also related to the height of the off-axial chief ray incident to the peripheral portion of the image, these aberrations may easily be corrected effectively by forming the sixth lens, at which the off-axial chief ray is high, as a biconvex positive lens. That is, when the sixth lens is formed into a biconvex shape, its positive refractive power is divided between two surfaces of the sixth lens. This serves to prevent the incident surface and the exit surface of the sixth lens from having extremely high curvatures. With this arrangement, the occurrence of astigmatism and coma can be prevented. Especially for an image forming optical system constituted by six lenses, since the sixth lens is located nearest the image forming surface side, it is preferable that the sixth lens has a biconvex shape in order to obtain telecentricity and to correct the astigmatism and coma.

For the image forming optical system of the second type, the following conditions (1A) and (2A) are satisfied in the basic arrangement:

$$-1.2 \leq fN/Ih \leq -0.5 \tag{1A}$$

$$0.85 \leq f1/f2 \leq 1.5 \tag{2A}$$

where f1 denotes a focal length of the first lens, f2 denotes a focal length of the second lens, fN denotes a focal length of the lens unit having the negative refractive power, and Ih denotes a maximum image height.

The configuration of the lens unit that has a negative refractive power and is arranged on the object side is important to the correction of a chromatic aberration of magnification and coma. Therefore, it is preferable that an appropriate negative refractive power be set. Thus, the optical system is constituted so as to satisfy the above conditions (1A) and (2A).

The condition (1A) defines the entire refractive power of the lens unit having the negative refractive power. When the negative refractive power of the lens unit is less than the lower limit provided by the condition (1A), the refractive power of the lens unit is too weak, and the entire optical system becomes too long. When the negative refractive power of the lens unit exceeds the upper limit provided by the condition (1A), the negative refractive power of the lens unit is too strong, and a large amount of aberrations are produced by the lens unit, which is difficult to be corrected by the lens unit having the positive refractive power.

The condition (2A) defines the ratio of the refractive powers of the first lens and the second lens. When the ratio is less than the lower limit provided by the condition (2A), the refractive power of the first lens is too strong, and the correction of coma and astigmatism is difficult. Or the refractive power of the second lens is too weak and the diameter of the lens is increased, or the correction of the chromatic aberration of magnification is difficult. When the ratio of the refractive powers exceeds the upper limit provided by the condition (2A), the refractive power of the first lens is too weak and the diameter of the lens is increased, or the correction of the chromatic aberration of magnification is difficult. Either this, or the refractive power of the second lens is too strong, and the correction of coma and astigmatism is difficult.

In addition, more preferable is that the following condition (1A') be satisfied.

$$-1.1 \leq fN/Ih \leq -0.7 \tag{1A'}$$

And much more preferable is that the following condition (1A") be satisfied.

$$-1.05 \leq fN/Ih \leq -0.9 \tag{1A"}$$

It should be noted that only the upper limit and the lower limit in either the condition (1A') or (1A") may be employed as the upper limit and the lower limit for the condition (1A).

Further, more preferable is that the following condition (2A') be satisfied.

$$0.9 \leq f1/f2 \leq 1.4 \tag{2A'}$$

And much more preferable is that the following condition (2A″) be satisfied.

$$1.10 \leq f1/f2 \leq 1.37 \quad (2A'')$$

It should be noted that only the upper limit and the lower limit in either the condition (2A′) or (2A″) may be employed as the upper limit and the lower limit for the condition (2A).

The image forming optical system of the third type is constituted to satisfy the following condition (3A) in the above described basic arrangement:

$$2.1 \leq f5/f \leq 4 \quad (3A)$$

where f5 denotes the focal length of the fifth lens, and f denotes the focal length of the entire image forming optical system.

Not only the lens unit having the negative refractive power, but also a lens that is included in the lens unit having the positive refractive power, which is located near the image forming surface and for which a ray, incident to the peripheral portion of the image, has a great height, is involved in the correction of a chromatic aberration of magnification. Further, since the entire image forming optical system provides a positive refractive power, if the positive lens of the lens unit having the positive refractive power is not appropriately constituted, it is difficult for the astigmatism and the coma to be satisfactorily corrected. Therefore, of the lenses constituting the lens unit having the positive refractive power, the fifth lens employs a formation that satisfies the above condition (3A).

When the ratio exceeds the upper limit provided by the condition (3A), the positive refractive power of the fifth lens is too weak, and astigmatism and coma can not satisfactorily be corrected. When the ratio is less than the lower limit, the positive refractive power of the fifth lens is too strong, and deterioration of the chromatic aberration of magnification tends to occur.

Further, more preferable is that the following condition (3A′) be satisfied.

$$2.2 \leq f5/f \leq 3.5 \quad (3A')$$

Further, it is even more preferable that the following condition (3A″) be satisfied.

$$2.4 \leq f5/f \leq 3.1 \quad (3A'')$$

It should be noted that only the upper limit or the lower limit in either the condition (3A′) or (3A″) be employed as the upper limit or the lower limit for the condition (3A).

The image forming optical system of the fourth type is constituted, in addition to the basic arrangement, to have an aperture stop which is located between the third lens and the fourth lens, and to satisfy the following condition (4A):

$$0.7 \leq d3S/Ih \leq 2 \quad (4A)$$

where d3S denotes an axial space from an image side surface of the third lens to the aperture stop, and Ih denotes a maximum image height.

In the lens unit having the negative refractive power, coma and astigmatism tend to occur, and especially, a chromatic aberration of magnification tends to occur. When such aberrations are to be corrected, not only the refractive powers of the lenses used for correction, but also the height of the ray is related to correction. That is, the third lens, which is the positive lens and is located nearer the image side than is the lens unit having the negative refractive power, should be appropriately formed, and the aperture stop should be arranged at an appropriate location. This enables to effectively correct the above described aberrations. Therefore, the aperture stop is arranged between the third lens and the fourth lens, and a structure that satisfies the condition (4A) is employed.

When the ratio exceeds the upper limit provided by the condition (4A), the axial space between the third lens and the aperture stop becomes excessive, and the size of the optical system tends to be increased. When the ratio is less than to the lower limit, the axial space between the third lens and the aperture stop is too small, and the correction of coma and of astigmatism, and especially of a chromatic aberration of magnification, is difficult.

At this time, more preferable is that the following condition (4A′) be satisfied.

$$1.1 \leq d3S/Ih \leq 1.8 \quad (4A')$$

Further, much more preferable is that the following condition (4A″) be satisfied.

$$1.1 \leq d3S/Ih \leq 1.6 \quad (4A'')$$

It should be noted that only the upper limit or the lower limit in either the condition (4A′) or (4A″) may be employed as the upper limit or the lower limit for the condition (4A).

The image forming optical system of the fifth type is constituted to satisfy the following condition (5A) in the above described basic arrangement.

$$-0.35 \leq fN/fP \leq -0.1 \quad (5A)$$

where fN denotes a focal length of the lens unit of the negative refractive power, and fP is a focal length of the lens unit having the positive refractive power.

In order to obtain a wide angle optical system whose half angle of view is more than 90°, the principle point of the optical system must be shifted to a position considerably nearer the image. Therefore, when the retrofocus type image forming optical system is employed, a lens unit having a strong negative refractive power should be arranged on the object side. Thus, the size and the performance of the optical system is varied greatly by the configuration of the lens unit having a positive refractive power that is arranged on the image forming side of the lens unit having the negative refractive power. Therefore, the lens unit having the positive refractive power, which includes the third to the sixth lenses, satisfies the above described condition (5A).

When the ratio exceeds the upper limit provided by the condition (5A), the negative refractive power is too strong, and the entire optical system becomes too long. When the ratio is less than the lower limit, the positive refractive power is too strong, and deterioration of coma and astigmatism tends to occur.

More preferable is that the following condition (5A′) be satisfied.

$$-0.3 \leq fN/fP \leq -0.15 \quad (5A')$$

Much more preferable is that the following condition (5A″) be satisfied.

$$-0.3 \leq fN/fP \leq -0.2 \quad (5A'')$$

It should be noted that only the upper limit or the lower limit in either the condition (5A′) or (5A″) may be employed as the upper limit or the lower limit for the condition (5A).

For the image forming optical systems of the above described types, for the purpose, for example, of aberration correction, another lens, in addition to the six basic lenses, may be arranged. However, while taking into account the downsizing of the system and a reduction in the number of lenses, it is preferable that a total of six lenses be employed for the image forming optical system.

For the image forming optical systems of the above described types, more preferable is that the second lens be a biconcave negative lens and that the following condition (6A) be satisfied:

$$6 \leq |r2f/f| \leq 200 \quad (6A)$$

where r2f denotes a paraxial radius of curvature of an object side surface of the second lens, and f denotes a focal length of the entire image forming optical system.

When the absolute value exceeds the upper limit provided by the condition (6A), the entrance pupil position is shifted to the image side, so that it is difficult for a chromatic aberration of magnification to be effectively corrected, and the diameter of the lens tends to be increased. When the absolute value is less than the lower limit, the refractive power of the lens is too strong, and coma, astigmatism and a chromatic aberration of magnification tend to be overcorrected.

In this case, more preferable is that the following condition (6A') be satisfied.

$$8 \leq |r2f/f| \leq 100 \quad (6A')$$

Much more preferable is that the following condition (6A") be satisfied.

$$12 \leq |r2f/f| \leq 80 \quad (6A")$$

It should be noted that only the upper limit or the lower limit in either the condition (6A') or (6A") may be employed as the upper limit or the lower limit for the condition (6A).

For the image forming optical systems of the above described types, more preferable is that the following condition (7A) be satisfied:

$$1.2 \leq f3/f5 \leq 2.5 \quad (7A)$$

where f3 denotes the focal length of the third lens, and f5 denotes the focal length of the fifth lens.

When the ratio exceeds the upper limit provided by the condition (7A), the positive refractive power of the third lens becomes relatively too weak, and it is difficult to correct coma, astigmatism and a chromatic aberration of magnification that occur at the first and second lenses, which are negative lenses. When the ratio is less than the lower limit provided by the condition (7A), the positive refractive power of the fifth lens becomes relatively too weak, and it is difficult to correct a spherical aberration and an axial chromatic aberration.

At this time, more preferable is that the following condition (7A') be satisfied.

$$1.4 \leq f3/f5 \leq 2 \quad (7A')$$

Much more preferable is that the following condition (7A") be satisfied.

$$1.6 \leq f3/f5 \leq 1.95 \quad (7A")$$

It should be noted that only the upper limit or the lower limit in either the condition (7A') or (7A") may be employed as the upper limit or the lower limit for the condition (7A).

For the image forming optical systems of the above described types, more preferable is that the following condition (8A) be satisfied:

$$1.5 \leq f45/f6 \leq 6 \quad (8A)$$

where f45 denotes a composite focal length of the fourth lens and the fifth lens, and f6 denotes a focal length of the sixth lens.

When the ratio exceeds the upper limit provided by the condition (8A), the positive refractive power of the fourth and fifth lenses become too weak, and it is difficult to correct coma and astigmatism. When the ratio is less than the lower limit, only small correction effects are obtained by the sixth lens, and it is difficult to correct astigmatism and a chromatic aberration of magnification.

At this time, more preferable is that the following condition (8A') be satisfied.

$$2 \leq f45/f6 \leq 4.5 \quad (8A')$$

Much more preferable is that the following condition (8A") be satisfied.

$$2 \leq f45/f6 \leq 3.5 \quad (8A")$$

It should be noted that only the upper limit or the lower limit in either the condition (8A') or (8A") may be employed as the upper limit or the lower limit for the condition (8A).

For the image forming optical systems of the above described types, more preferable is that the sixth lens be a biconvex positive lens, and that the following condition (9A) be satisfied:

$$-0.8 \leq (r6f+r6r)/(r6f-r6r) \leq 0.8 \quad (9A)$$

where r6f denotes a paraxial radius of curvature of an object side surface of the sixth lens, and r6r denotes a paraxial radius of curvature of an image side surface of the sixth lens.

When the ratio exceeds the upper limit provided by the condition (9A), either the refractive power of the surface of the sixth lens on the incidence side becomes too weak or the refractive power on the exit side becomes too strong. When the refractive power becomes too weak, it is difficult to effectively correct a spherical aberration and coma, or when the refractive power becomes too strong, higher order aberrations tend to occur. When the ratio is less than the lower limit, either the refractive power of the surface on the incident side is too strong or the refractive power of the surface on the exit side is too weak. When the refractive power is too strong, higher order aberrations tend to occur, or when the refractive power is too weak, effective correction of the spherical aberration and coma is difficult.

At this time, more preferable is that the following condition (9A') be satisfied.

$$-0.65 \leq (r6f+r6r)/(r6f-r6r) \leq 0.65 \quad (9A')$$

Much more preferable is that the following condition (9A") be satisfied.

$$-0.3 \leq (r6f+r6r)/(r6f-r6r) \leq 0.55 \quad (9A")$$

It should be noted that only the upper limit or the lower limit in either the condition (9A') or (9A") may be employed as the upper limit or the lower limit for the condition (9A).

For the image forming optical systems of the first, third and fifth type, as well as the second type, it is also preferable that an aperture stop be arranged between the third lens and the fourth lens.

Generally, in a vehicular mounted camera, a surveillance camera, or the like, the light receiving surface of an image sensor, such as a CCD image sensor or a CMOS image sensor, is located at the image forming surface position of an image forming optical system. Therefore, a ray exit from the optical system should be as perpendicular as possible to the image forming surface. Further, when an image forming optical system is a wide-angle optical system having a very large angle of view, it is preferable that an aperture stop be arranged at an appropriate location in order to obtain an appropriate height for a ray to correct a chromatic aberration of magnification. The aperture stop has a function for determining the position whereat an off-axial light flux is passed through, and when the aperture stop is arranged too near the object, the height of the ray entering the fifth and sixth lenses is increased, and the correction of coma and astigmatism is difficult. When the aperture stop is arranged too near the image forming surface, it becomes difficult to secure the telecentricity of the image forming optical system, and the diameter of the first lens tends to be increased. Therefore, when the aperture stop is arranged between the third lens and the fourth lens, the securing of the wide angle of view, the downsizing of the optical system, the securing of telecentricity, and the correction of coma and astigmatism can be achieved in balance.

Furthermore, for the image forming optical systems of the above described types, it is more preferable that the fourth lens and the fifth lens be cemented together and the cemented surface have a negative refractive power, and that the Abbe number of the fourth lens be smaller than the Abbe number of the fifth lens.

For the image forming optical systems of the above described types, an axial chromatic aberration tends to occur at the third lens, which is a positive lens. Therefore, it is preferable that the fourth lens and the fifth lens be cemented so as to provide a cemented surface having a negative refractive power, and that the Abbe number for the fourth lens, which is a negative lens, be smaller than the Abbe number for the fifth lens, which is a positive lens, so that an axial chromatic aberration can occur at the cemented surface in the direction opposite that of the axial chromatic aberration that occurs at the third lens.

For the image forming optical systems of the above described types, when a lens component is defined as a "lens for which only the surface on the incidence side and the surface on the exit side contact air near the optical axis, and no air space exists therebetween", i.e., defined as a single lens element or a cemented lens, it is preferable that five lens components, i.e., the first lens, the second lens, the third lens, a cemented lens formed by cementing the fourth lens and the fifth lens, and the sixth lens be arranged in order from the object side, with air spaces between the respective lenses.

When this arrangement is employed for the image forming optical system of each type, the functions of the described lenses can be effectively utilized, and the correction of aberrations and a reduction in the size can be easily obtained while the optical system provides a wide angle of view.

For the image forming optical systems of the above described types, it is preferable that the maximum half angle of view satisfy the following condition (10A):

$$80° \leq \omega \leq 105° \tag{10A}$$

where ω denotes the maximum half angle of view for the image optical system.

When the maximum half angle of view exceeds the upper limit provided by the condition (10A), coma tends to be degraded, and the improvement of image quality is difficult. When the maximum half angle of view is less than to the lower limit, the field of view is narrowed, causing a blind spot, and a case tends to occur wherein an image pickup range, required for a surveillance camera, a vehicular camera, or the like, can not be obtained.

At this time, it is more preferable that the following condition (10A') be satisfied.

$$85° \leq \omega \leq 100° \tag{10A'}$$

Much more preferable is that the following condition (10A") be satisfied.

$$90° \leq \omega \leq 100° \tag{10A"}$$

It should be noted that only the upper limit or the lower limit in either the condition (10A') or (10A") may be employed as the upper limit or the lower limit for the condition (10A).

For the image forming optical systems of the above described types, it is preferable that the following condition (11A) be satisfied.

$$0.7 \leq r1r/d1r \leq 1.5 \tag{11A}$$

where r1r denotes a paraxial radius of curvature of an image side surface of the first lens, and d1r denotes an axial space from the image side surface of the first lens to the object side surface of the second lens.

It is preferable that the paraxial radius of the curvature of the image side surface of the first lens be smaller than that of the object side surface, where rays for a wide angle of view enter. Then, the effective diameters of the second lens and the successive lenses can be reduced, while a wide angle of view is maintained. Therefore, in order to reduce the radius of curvature of the image side surface of the first lens, an appropriate axial space, as described above, should be set that extends from the image side surface of the first lens to the object side surface of the second lens.

When the ratio exceeds the upper limit provided by the condition (11A), the refractive power of the image side surface of the first lens is too weak, or the space between the first lens and the second lens is too narrow. Thus, it is difficult for the off-axial light flux to be greatly refracted by the first lens alone, and the entire image optical system becomes too long. When the ratio is less than the lower limit, the refractive power of the image side surface of the first lens is too strong, or the space between the first and the second lenses is too extended. Thus, it is difficult to secure the off-axial light flux in the wider angle area.

In this case, more preferable is that the following condition (11A') be satisfied.

$$0.75 \leq r1r/d1r \leq 1.3 \tag{11A'}$$

Much more preferable is that the following condition (11A") be satisfied.

$$0.8 \leq r1r/d1r \leq 1.1 \tag{11A"}$$

It should be noted that only the upper limit or the lower limit either of the condition (11A') or (11A") may be employed as the upper limit or the lower limit of the condition (11A).

As for a specific arrangement of the image forming optical systems of the above described types, the first lens is a negative meniscus lens, the convex surface of which is directed toward the object side; the second lens is a biconcave negative lens, for which the absolute value of the paraxial radius of curvature of the image side surface is smaller than the absolute value of the paraxial radius of curvature of the object side surface; the third lens is a biconvex positive lens, for which the absolute value of the paraxial radius of curvature of the image side surface is smaller than the absolute value of the paraxial radius of curvature of the object side surface; the fourth lens is a negative lens, for which the absolute value of the paraxial radius of curvature of the image side surface is smaller than the absolute value of the paraxial radius of curvature of the object side surface; the fifth lens is a biconvex positive lens, which is cemented to the fourth lens; and the sixth lens is a biconvex positive lens. For this arrangement, it is preferable that an aperture stop be arranged between the third lens and the fourth lens.

By employing this arrangement, aberrations can be satisfactorily corrected while a wider angle of view is obtained, and securing of telecentricity is also easily achieved. Further, since the first lens and the second lens have the above described shapes, the off-axial light flux can be gradually refracted, and a wide angle of view can be obtained, while at the same time, the occurrence of aberrations is prevented. Further, since the third lens has the above described shape, the two convex surfaces are employed to reduce the degree of divergence of the axial light flux and the off-axial light flux, or to cause these light fluxes to converge. Thus, an aberration that has occurred because negative lenses having negative refractive power are employed for the first and second lenses can be reduced. In addition, since the fourth lens, the fifth lens and the sixth lens, which are arranged following the aperture stop, are shaped as described above, the light flux is bent as it approaches the telecentric state. At this time, in order to appropriately correct a chromatic aberration using the fourth lens and the fifth lens, the curvature of the cemented surface is increased. Also, in order to prevent the occurrence of an aberration, the image side surface of the fourth lens and the both surfaces of the sixth lens are defined as surfaces having positive refractive power.

When the image forming optical system of each of the above types is applied for an image pickup apparatus, it is preferable that the light receiving surface of an electronic image sensor be arranged on the exit side of the image forming optical system, and that an optical image, formed by the image forming optical system, be received at the light receiving surface and be converted into an electrical signal.

When one of the above described image forming optical systems is employed for an image pickup apparatus, telecentricity can be obtained, so that for the image pickup apparatus, an adverse affect can be removed when a ray enters the image sensor obliquely. In this case, for the image forming optical system, the maximum image height Ih defines half the diagonal length of the effective image pickup area of the light receiving surface of the image sensor. The effective image pickup area means the maximum range of the image pickup area, on the photo-electric conversion surface (light receiving surface) of the electronic image sensor, by which the image signal used for displaying or printing is received.

For the image forming optical systems of the above described types, more preferable is that a plurality of the various characteristics described above be established at the same time, because these effects can be simultaneously obtained.

NUMERICAL EXAMPLES

Numerical examples 1 through 4 will now be described.

According to the data table for each numerical example 1 through 4, R denotes the radius of curvature of the surface of each lens; D denotes the thickness of each lens or the space between the lens surfaces; Nd denotes a refractive index for the wavelength of d-line of each lens; Vd denotes the Abbe number for the wavelength of d-line of each lens; K denotes a conic constant; and $A_4$, $A_6$, $A_8$ and $A_{10}$ denote aspherical coefficients.

Further, the shape of an aspherical surface is represented by the following expression using the conic constant and the aspherical coefficients, where Z denotes the coordinate in the direction of the optical axis, and Y denotes the coordinate in the direction perpendicular to the optical axis.

$$Z=(Y^2/r)/[1+\{1-(1+k)\cdot(Y/r)^2\}^{1/2}]+A_4Y^4+A_6Y^6+A_8Y^8+A_{10}Y^{10}$$

Furthermore, according to each numerical example, the image height and the angle of view are almost proportional to each other, due to the occurrence of distortion, and the similar property as that of a so-called f-θ lens is obtained. It should be noted that an ideal image height is employed as a reference in defining the distortion, and thus, when the half angle of view is equal to or greater than 90°, the value of the distortion can not be defined. Therefore, for a distortion, the aberration curve is cut off at the angle of view of 90°, and for a larger angle of view, no aberration curve portion is shown.

Example 1

Figure 2:
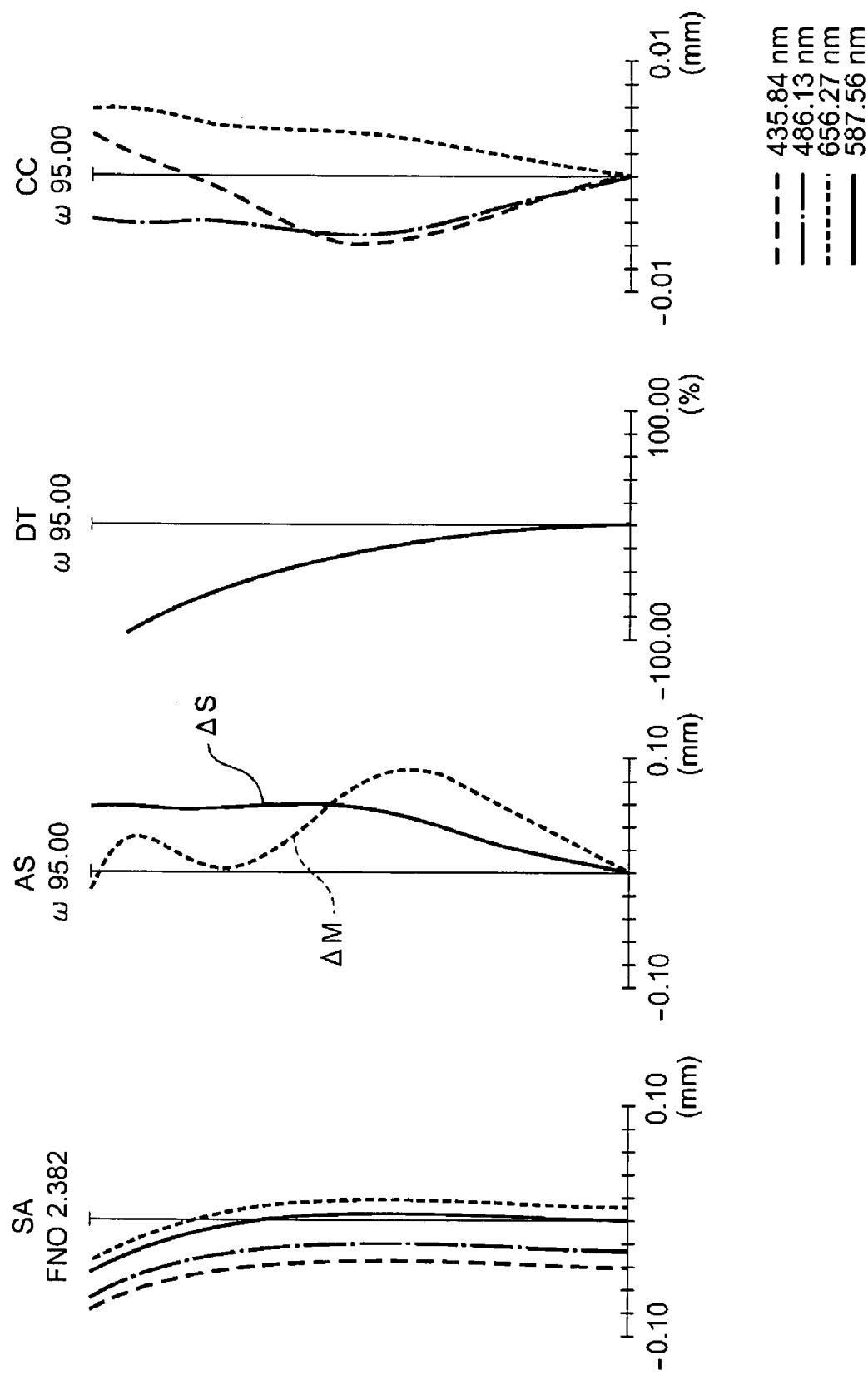
FIG. 2 is aberration diagrams for example 1.

FIG. 1 is a cross-sectional view of an image forming optical system of example 1, taken along the surface that includes the optical axis. FIG. 2 is an aberration diagram of example 1. SA denotes a spherical aberration, AS denotes astigmatism, DT denotes a distortion, CC denotes a chromatic aberration of magnification, ω denotes a half angle of view, and FNO denotes an F number.

As shown in FIG. 1, this image forming optical system includes, in order from the object side, a first lens $L_1$, a second lens $L_2$, a third lens $L_3$, an aperture stop S, a fourth lens $L_4$, a fifth lens $L_5$, a sixth lens $L_6$, a low pass filter LPF, which has an IR cut coating on the surface thereof, and a cover glass CG.

The first lens $L_1$ is a negative meniscus lens, the convex surface of which is directed toward the object side. The second lens $L_2$ is a biconcave negative lens, the third lens $L_3$ is a biconvex positive lens, the fourth lens $L_4$ is a biconcave negative lens, the fifth lens $L_5$ is a biconvex positive lens, and the sixth lens $L_6$ is a biconvex positive lens. The fourth lens $L_4$ and the fifth lens $L_5$ are cemented, and both surfaces of the sixth lens $L_6$ are aspherical. Further, the sixth lens $L_6$ is made of a material of amorphous polyolefin type, ZEONEX® (ZEON CORPORATION).

For example 1, the focal length is 1.25 mm, the maximum image height is 1.91 mm, the half angle of view is 95° and the F number is 2.382.

The lens data of example 1 are shown below.

TABLE 1

| Surface | R | D | Nd | Vd |
|---|---|---|---|---|
| 1 | 17.9924 | 1.000 | 1.78590 | 44.20 |
| 2 | 3.3300 | 3.314 | | |
| 3 | −17.7711 | 1.000 | 1.64000 | 60.08 |
| 4 | 3.6309 | 2.100 | | |
| 5 | 109.6532 | 2.500 | 1.80518 | 25.42 |
| 6 | −5.2370 | 2.907 | | |
| 7(AS) | ∞ | 0.780 | | |
| 8 | −45.9612 | 1.000 | 1.78472 | 25.68 |
| 9 | 2.9148 | 3.300 | 1.60311 | 60.64 |
| 10 | −4.8466 | 0.200 | | |
| 11* | 6.4653 | 1.900 | 1.52542 | 55.78 |
| 12* | −7.8487 | 1.379 | | |
| 13 | ∞ | 2.081 | 1.51633 | 64.14 |
| 14 | ∞ | 0.520 | | |
| 15 | ∞ | 0.520 | 1.51633 | 64.14 |
| 16 | ∞ | 0.500 | | |
| 17(IS) | ∞ | | | |

*Aspherical surface
(AS): Aperture stop
(IS): Image surface

TABLE 2

| | | | Aspherical coefficients | | | |
|---|---|---|---|---|---|---|
| Surface | R | k | $A_4$ | $A_6$ | $A_8$ | $A_{10}$ |
| 11 | 6.465 | −2.020 | $-1.42152 \times 10^{-3}$ | $1.09596 \times 10^{-3}$ | $-9.15947 \times 10^{-5}$ | $1.08498 \times 10^{-5}$ |
| 12 | −7.849 | −0.349 | $1.22449 \times 10^{-3}$ | $-4.71123 \times 10^{-4}$ | $2.63636 \times 10^{-4}$ | $-9.93439 \times 10^{-6}$ |

Example 2

Figure 3:
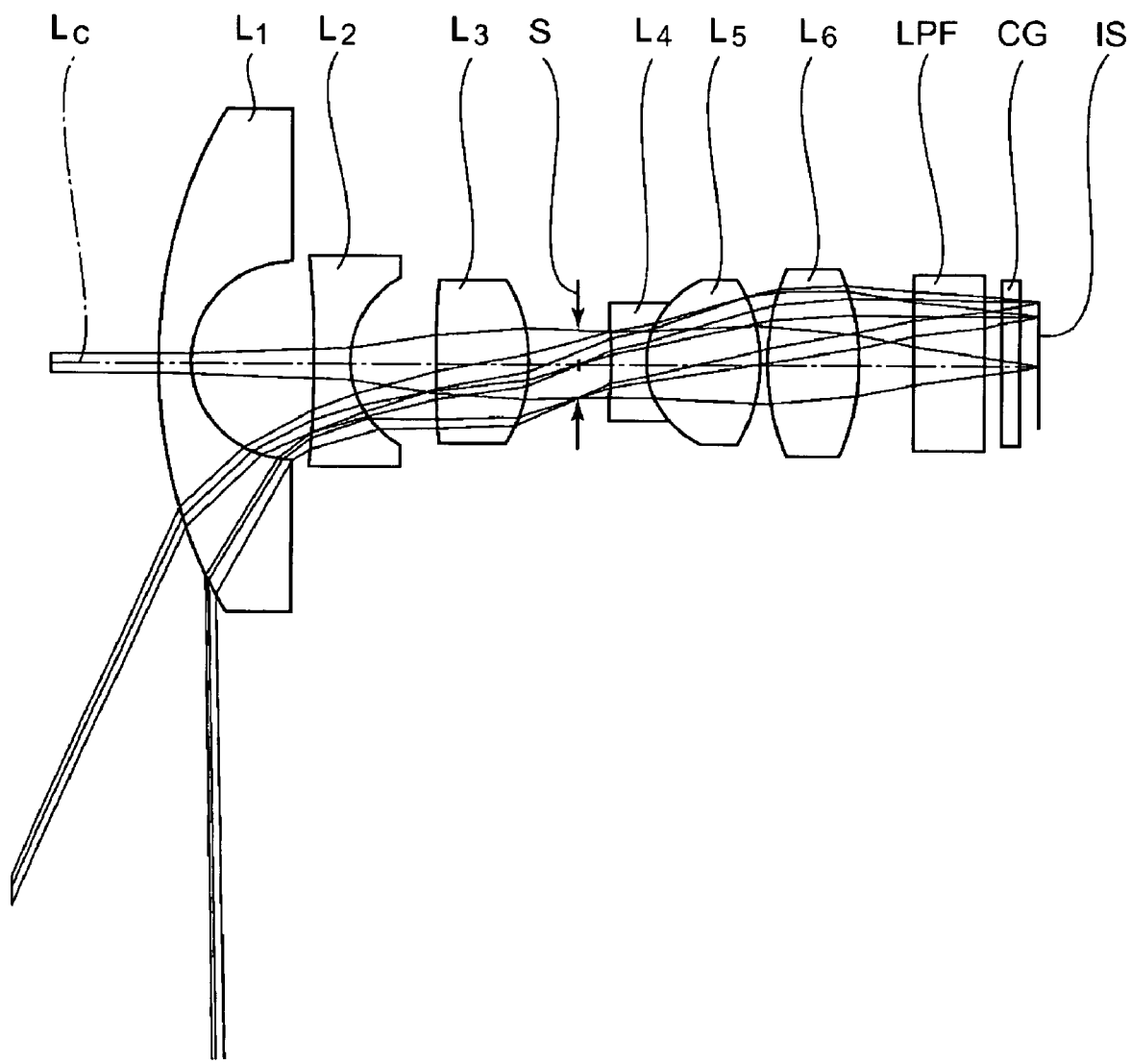
FIG. 3 is a cross-sectional view of example 2 of the present invention, taken along a surface including an optical axis.
Figure 4:
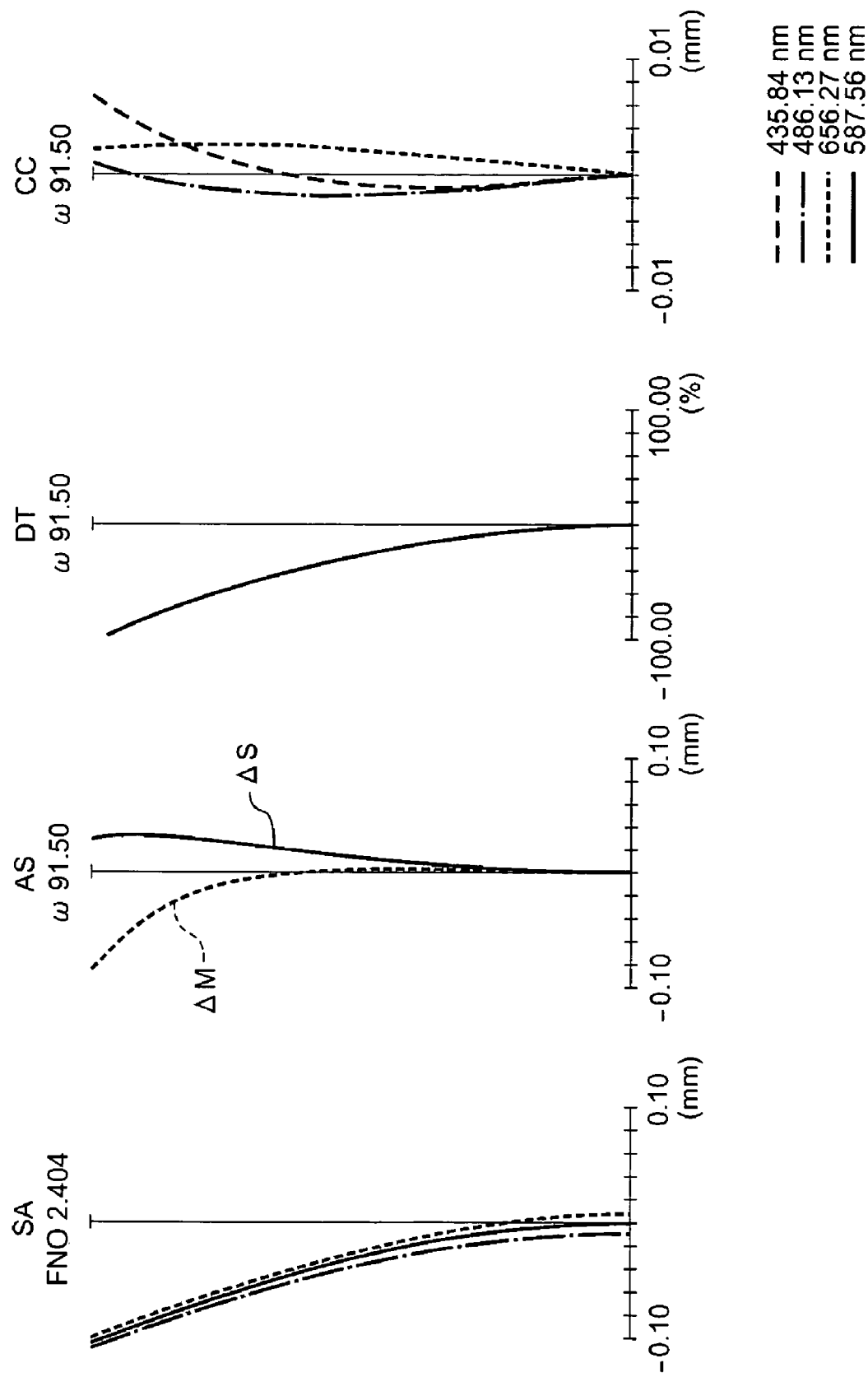
FIG. 4 is aberration diagrams for example 2.

FIG. 3 is a cross-sectional view of an image forming optical system of example 2, taken along the surface that includes the optical axis. FIG. 4 is an aberration diagram of example 2. SA denotes a spherical aberration, AS denotes astigmatism, DT denotes a distortion, CC denotes a chromatic aberration of magnification, ω denotes a half angle of view, and FNO denotes an F number.

As shown in FIG. 3, this image forming optical system includes, in order from the object side, a first lens $L_1$, a second lens $L_2$, a third lens $L_3$, an aperture stop S, a fourth lens $L_4$, a fifth lens $L_5$, a sixth lens $L_6$, a low pass filter LPF, which has an IR cut coating on the surface thereof, and a cover glass CG.

The first lens $L_1$ is a negative meniscus lens, the convex surface of which is directed toward the object side. The second lens $L_2$ is a biconcave negative lens, the third lens $L_3$ is a biconvex positive lens, the fourth lens $L_4$ is a biconcave negative lens, the fifth lens $L_5$ is a biconvex positive lens, and the sixth lens $L_6$ is a biconvex positive lens. The fourth lens $L_4$ and the fifth lens $L_5$ are cemented, and the surfaces of all the lenses are spherical.

For example 2, the focal length is 1.28 mm, the maximum image height is 1.82 mm, the half angle of view is 91.5° and the F number is 2.404.

The lens data of example 2 are shown below.

TABLE 3

| Surface | R | D | Nd | Vd |
|---|---|---|---|---|
| 1 | 14.5023 | 1.000 | 1.65160 | 58.55 |
| 2 | 2.8750 | 3.511 | | |
| 3 | −47.1155 | 1.000 | 1.62041 | 60.29 |
| 4 | 2.7853 | 2.448 | | |
| 5 | 31.8922 | 2.600 | 1.80518 | 25.42 |
| 6 | −4.9596 | 1.450 | | |
| 7(AS) | ∞ | 0.990 | | |
| 8 | −13.4649 | 1.000 | 1.80518 | 25.42 |
| 9 | 2.5870 | 3.200 | 1.62041 | 60.29 |
| 10 | −4.5451 | 0.200 | | |
| 11 | 6.4859 | 2.600 | 1.48749 | 70.23 |
| 12 | −7.0124 | 1.500 | | |
| 13 | ∞ | 2.000 | 1.51633 | 64.14 |
| 14 | ∞ | 0.500 | | |
| 15 | ∞ | 0.500 | 1.51633 | 64.14 |
| 16 | ∞ | 0.500 | | |
| 17(IS) | ∞ | | | |

(AS): Aperture stop
(IS): Image surface

Example 3

Figure 5:
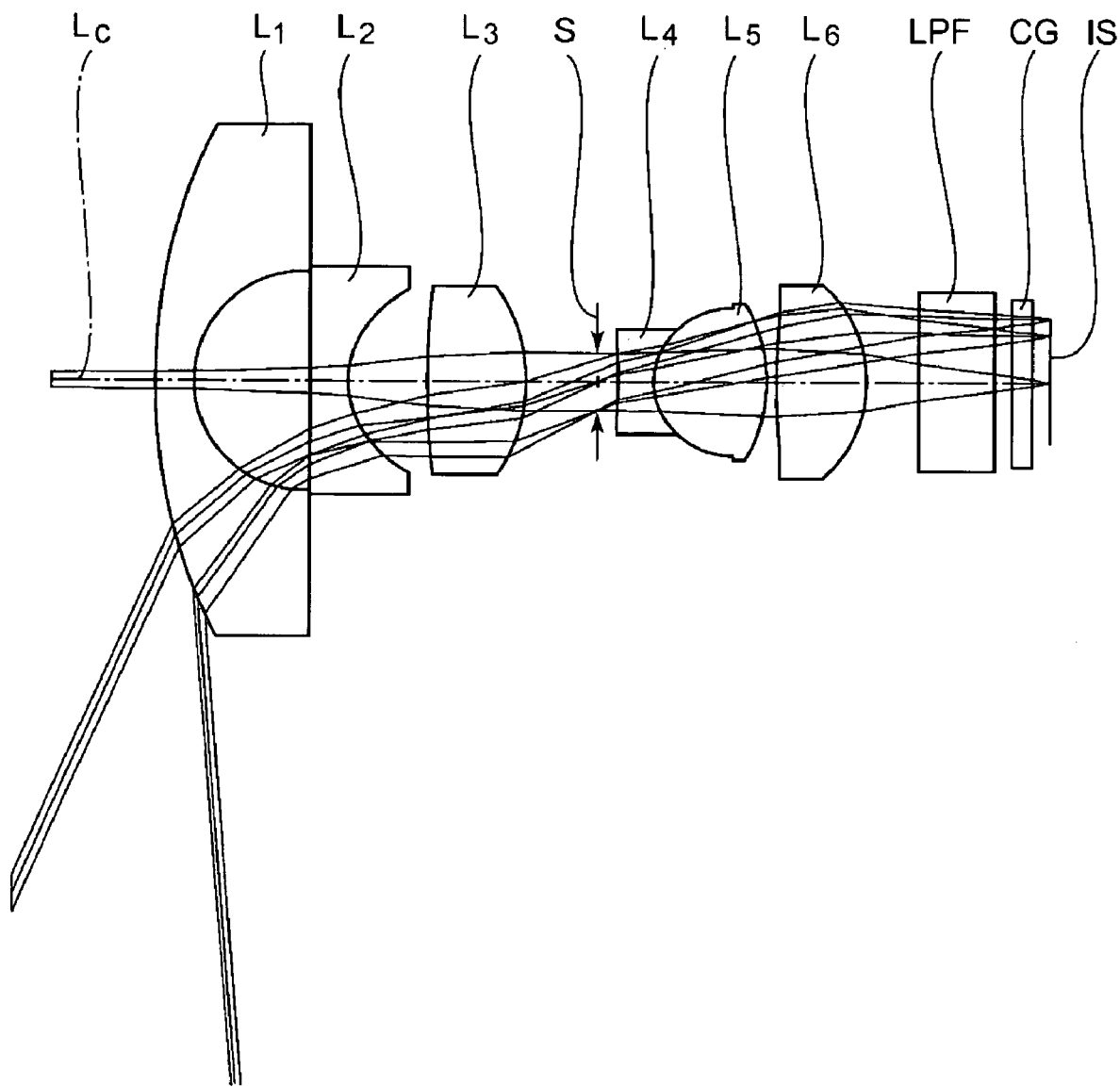
FIG. 5 is a cross-sectional view of example 3 of the present invention, taken along a surface including an optical axis.
Figure 6:
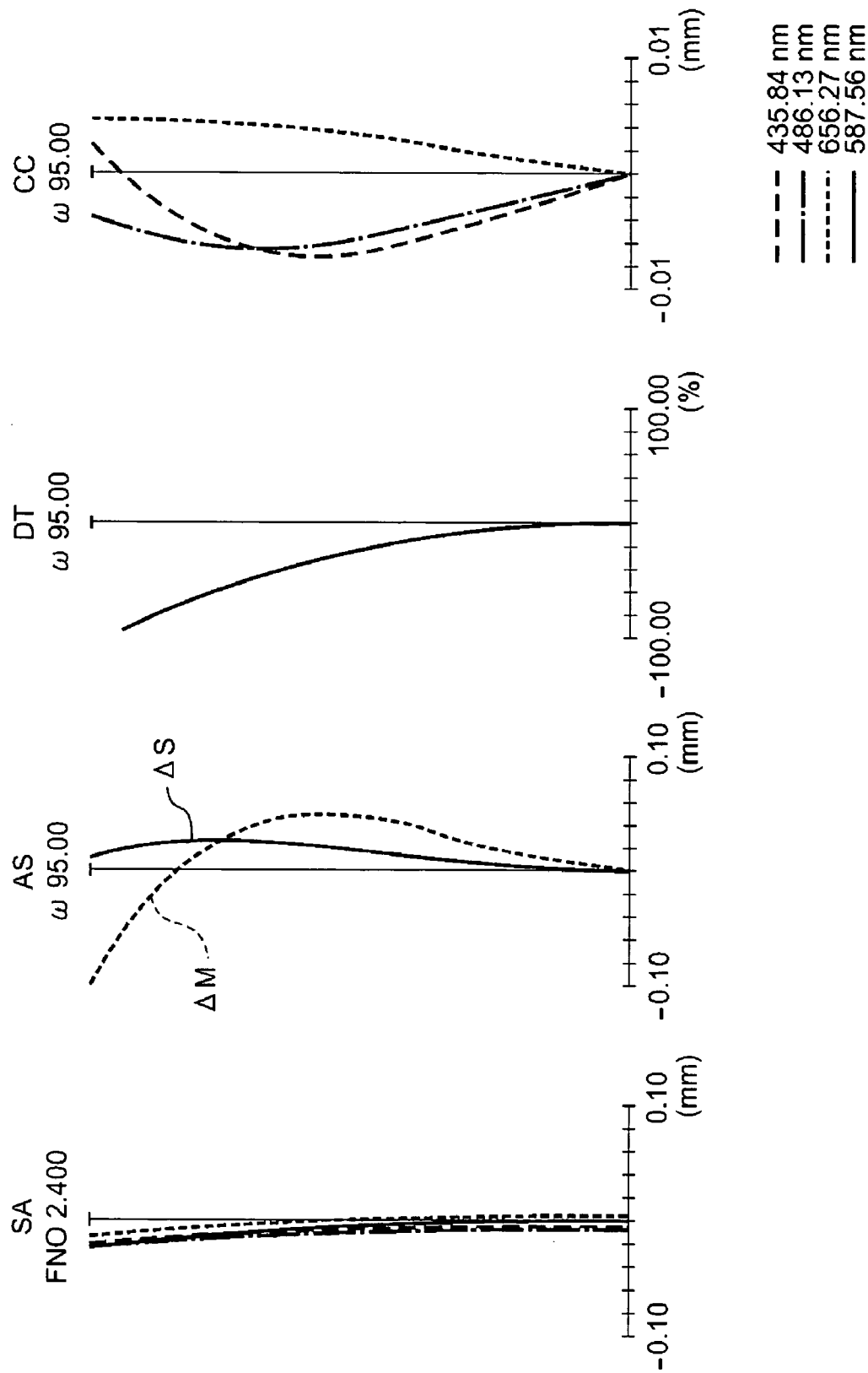
FIG. 6 is aberration diagrams for example 3.

FIG. 5 is a cross-sectional view of an image forming optical system of example 3, taken along the surface that includes the optical axis. FIG. 6 is an aberration diagram of example 3. SA denotes a spherical aberration, AS denotes astigmatism, DT denotes a distortion, CC denotes a chromatic aberration of magnification, ω denotes a half angle of view, and FNO denotes an F number.

As shown in FIG. 5, this image forming optical system includes, in order from the object side, a first lens $L_1$, a second lens $L_2$, a third lens $L_3$, an aperture stop S, a fourth lens $L_4$, a fifth lens $L_5$, a sixth lens $L_6$, a low pass filter LPF, which has an IR cut coating on the surface thereof, and a cover glass CG.

The first lens $L_1$ is a negative meniscus lens, the convex surface of which is directed toward the object side. The second lens $L_2$ is a biconcave negative lens, the third lens $L_3$ is a biconvex positive lens, the fourth lens $L_4$ is a biconcave negative lens, the fifth lens $L_5$ is a biconvex positive lens, and the sixth lens $L_6$ is a biconvex positive lens. The fourth lens $L_4$ and the fifth lens $L_5$ are cemented, and only the object side surface of the sixth lens $L_6$ is aspherical. Further, the sixth lens $L_6$ is made of a material of amorphous polyolefin type, ZEONEX®.

For example 3, the focal length is 1.25 mm, the maximum image height is 1.91 mm, the half angle of view is 95° and the F number is 2.400.

The lens data for example 3 are shown below.

TABLE 4

| Surface | R | D | Nd | Vd |
|---|---|---|---|---|
| 1 | 17.6037 | 1.000 | 1.74320 | 49.34 |
| 2 | 3.2899 | 3.369 | | |
| 3 | −90.6551 | 1.000 | 1.62041 | 60.29 |
| 4 | 3.1186 | 2.200 | | |
| 5 | 27.4145 | 2.800 | 1.80518 | 25.42 |
| 6 | −5.1712 | 2.098 | | |
| 7(AS) | ∞ | 0.533 | | |
| 8 | −13.1872 | 1.000 | 1.78472 | 25.68 |
| 9 | 2.2035 | 3.200 | 1.62041 | 60.29 |
| 10 | −4.7017 | 0.200 | | |
| 11* | 11.7813 | 2.600 | 1.52542 | 55.78 |
| 12 | −3.9756 | 1.379 | | |
| 13 | ∞ | 2.081 | 1.51633 | 64.14 |
| 14 | ∞ | 0.520 | | |
| 15 | ∞ | 0.520 | 1.51633 | 64.14 |
| 16 | ∞ | 0.500 | | |
| 17(IS) | ∞ | | | |

*Aspherical surface
(AS): Aperture stop
(IS): Image surface

TABLE 5

| Surface | R | k | Aspherical coefficients | | | |
| --- | --- | --- | --- | --- | --- | --- |
| | | | $A_4$ | $A_6$ | $A_8$ | $A_{10}$ |
| 11 | 11.781 | 0.000 | $-3.88858 \times 10^{-3}$ | $1.06129 \times 10^{-4}$ | $-1.70031 \times 10^{-5}$ | |

Example 4

Figure 7:
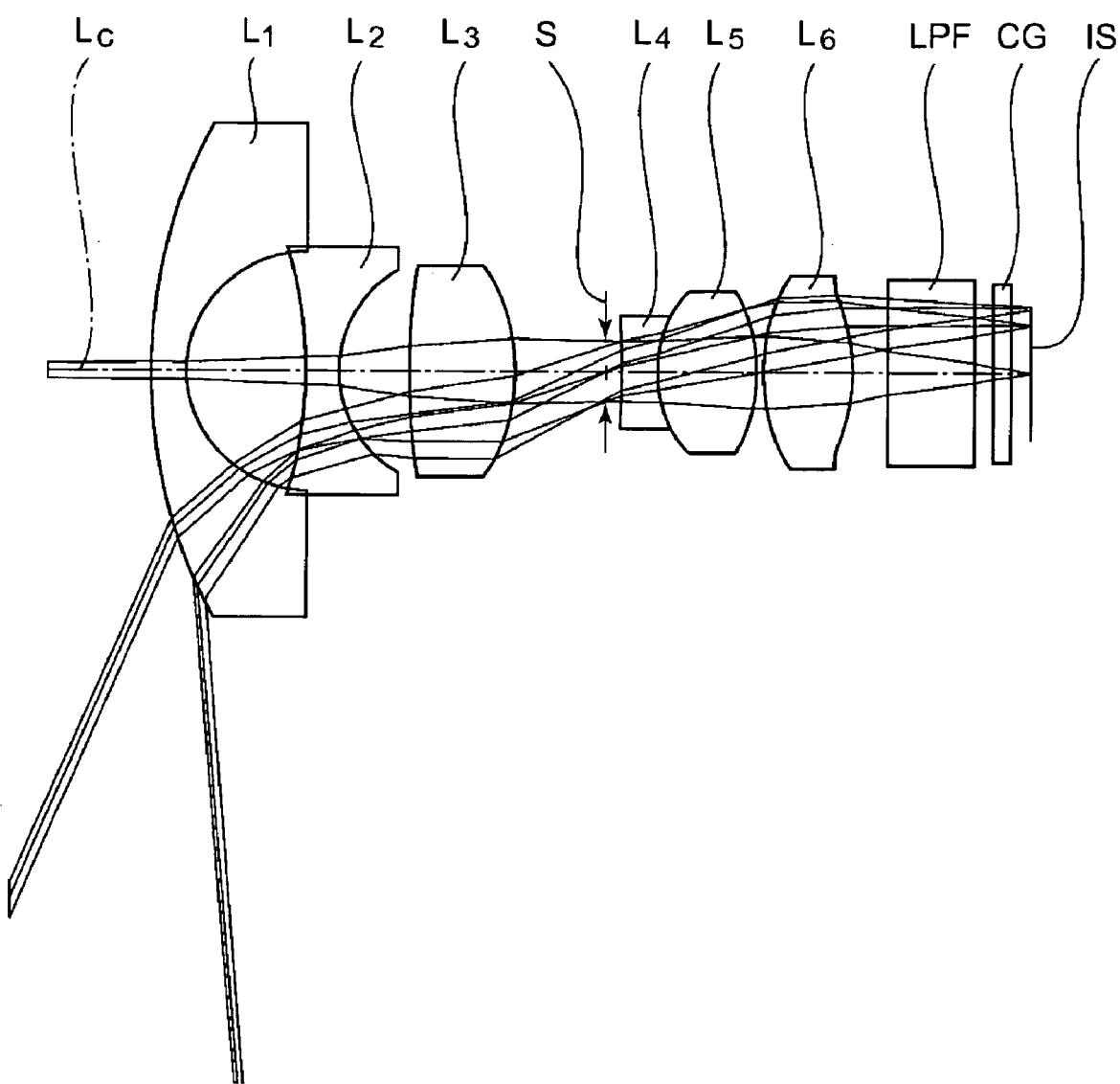
FIG. 7 is a cross-sectional view of example 4 of the present invention, taken along a surface including an optical axis.
Figure 8:
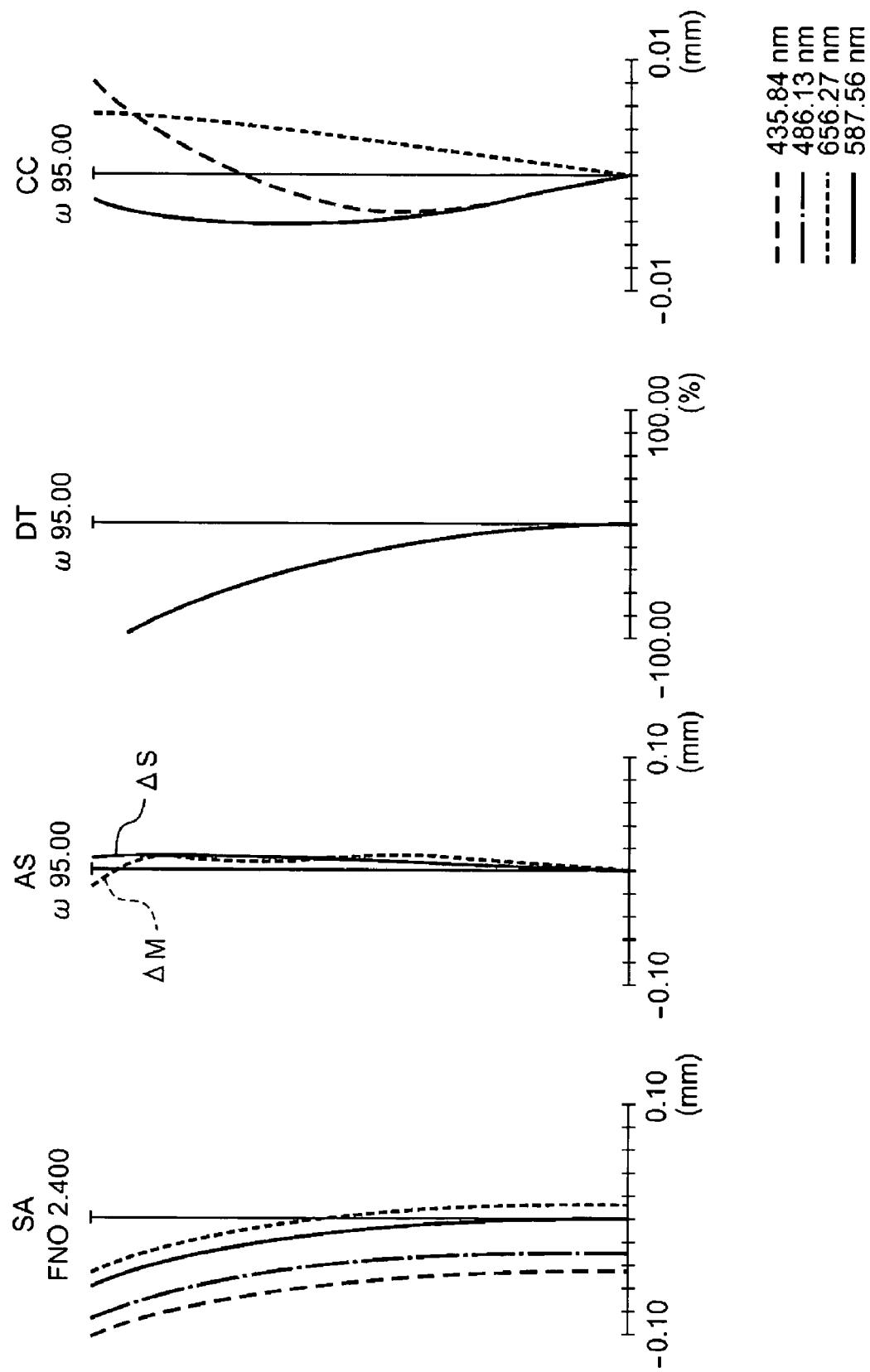
FIG. 8 is aberration diagrams for example 4.

FIG. 7 is a cross-sectional view of an image forming optical system of example 4, taken along the surface that includes the optical axis. FIG. 8 is an aberration diagram of example 4. SA denotes a spherical aberration, AS denotes astigmatism, DT denotes a distortion, CC denotes a chromatic aberration of magnification, ω denotes a half angle of view, and FNO denotes an F number.

As shown in FIG. 7, this image forming optical system includes, in order from the object side, a first lens $L_1$, a second lens $L_2$, a third lens $L_3$, an aperture stop S, a fourth lens $L_4$, a fifth lens $L_5$, a sixth lens $L_6$, a low pass filter LPF, which has an IR cut coating on the surface thereof, and a cover glass CG.

The first lens $L_1$ is a negative meniscus lens, the convex surface of which is directed toward the object side. The second lens $L_2$ is a biconcave negative lens, the third lens $L_3$ is a biconvex positive lens, the fourth lens $L_4$ is a biconcave negative lens, the fifth lens $L_5$ is a biconvex positive lens, and the sixth lens $L_6$ is a biconvex positive lens. The fourth lens $L_4$ and the fifth lens $L_5$ are cemented, and both surfaces of the sixth lens $L_6$ are aspherical. Further, the sixth lens $L_6$ is made of a material of amorphous polyolefin type, ZEONEX®.

For example 4, the focal length is 1.24 mm, the maximum image height is 1.90 mm, the half angle of view is 95° and the F number is 2.400.

The lens data for example 4 are shown below.

TABLE 6

| Surface | R | D | Nd | Vd |
| --- | --- | --- | --- | --- |
| 1 | 14.7830 | 1.000 | 1.83400 | 37.16 |
| 2 | 3.3980 | 3.390 | | |
| 3 | −13.2720 | 1.000 | 1.58313 | 59.38 |
| 4 | 3.3200 | 2.000 | | |
| 5 | 23.5310 | 3.000 | 1.84666 | 23.78 |
| 6 | −5.6040 | 2.640 | | |
| 7(AS) | ∞ | 0.500 | | |
| 8 | −12.6420 | 1.000 | 1.84666 | 23.78 |
| 9 | 3.5010 | 2.800 | 1.58313 | 59.38 |
| 10 | −5.0200 | 0.200 | | |
| 11* | 5.5820 | 2.500 | 1.52542 | 55.78 |
| 12* | −5.0550 | 1.000 | | |
| 13 | ∞ | 2.500 | 1.51633 | 64.14 |
| 14 | ∞ | 0.500 | | |
| 15 | ∞ | 0.500 | 1.51633 | 64.14 |
| 16 | ∞ | 0.590 | | |
| 17(IS) | ∞ | | | |

*Aspherical surface
(AS): Aperture stop
(IS): Image surface

TABLE 7

| Surface | R | K | Aspherical coefficients | | | |
| --- | --- | --- | --- | --- | --- | --- |
| | | | $A_4$ | $A_6$ | $A_8$ | $A_{10}$ |
| 11 | 5.582 | −1.2821 | $-9.3863 \times 10^{-4}$ | $2.7494 \times 10^{-4}$ | $1.9186 \times 10^{-5}$ | |
| 12 | −5.055 | 0.0000 | $1.1649 \times 10^{-3}$ | $2.8335 \times 10^{-5}$ | $6.1652 \times 10^{-5}$ | |

Data corresponding to the described conditions in examples 1 to 4 are as shown in the following table 8.

TABLE 8

| Condition | Example | | | |
| --- | --- | --- | --- | --- |
| | Ex. 1 | Ex. 2 | Ex. 3 | Ex. 4 |
| (1A): fN/Ih | −0.95 | −0.95 | −0.99 | −0.94 |
| (2A): f1/f2 | 1.16 | 1.35 | 1.16 | 1.24 |
| (3A): f5/f | 2.87 | 2.51 | 2.35 | 3.26 |
| (4A): d3S/Ih | 1.52 | 0.80 | 1.10 | 1.39 |
| (5A): fN/fP | −0.23 | −0.26 | −0.25 | −0.22 |
| (6A): r2f/f | −14.22 | −36.81 | −72.51 | −10.74 |
| (7A): f3/f5 | 1.74 | 1.72 | 1.91 | 1.39 |
| (8A): f45/f6 | 2.14 | 3.12 | 4.71 | 35.13 |
| (9A): (r6f + r6r)/(r6f − r6r) | −0.10 | −0.04 | −0.50 | 0.05 |
| (10A): ω | 95° | 91.5° | 95° | 95° |
| (11A): r1r/d1r | 1.005 | 0.819 | 0.977 | 1.002 |

Next, image forming optical systems of sixth to ninth types will now be described.

Generally, a retrofocus type optical system is employed for a wide-angle optical system, which comprises, in order from the object side, a lens unit having a negative refractive power and a lens unit having a positive refractive power. When this optical system is employed for constituting an optical system having a super-wide half angle of view of about 90°, focal length must be reduced. Therefore, the negative refractive power of the lens unit having a negative refractive power should be increased and the principal point should be shifted to the image forming surface side. Further, in order to compensate for an aberration that occurs due to this arrangement, the lens unit having the positive refractive power should be appropriately formed. When the half angle of view is greater than 90°, i.e., a case of wherein a ray is bent that enters from behind the object side surface of the lens in the optical system that is located nearest the object, a greater aberration than normal will occur. Thus, in order to prevent the occurrence of such an aberration, the lenses constituting the lens unit having the negative refractive power and the lens unit having the positive refractive power must be arranged appropriately.

Therefore, the following arrangement is employed as the basic arrangement for the image forming optical systems of the sixth to the ninth types. That is, the image forming optical system comprises a lens unit having a negative refractive power and a lens unit having a positive refractive power in order from the object side. The lens unit having the negative refractive power comprises, in order from the object side, a first lens that is a negative lens, a second lens that is a negative lens and a third lens that is a negative lens, and the lens unit having the positive refractive power comprises, in order from the object side, a fourth lens that is a positive lens, a fifth lens that is a negative lens, a sixth lens that is a positive lens and a seventh lens that is a positive lens.

With this basic arrangement, in the image forming optical systems of the sixth to the ninth types, the axial light flux that is diverged by the lens unit having the negative refractive power, is converged by the lens unit having the positive refractive power. At this time, when the degree of convergence of the axial light flux effected by the lens unit having the positive refractive power is higher, a wider angle of view can be obtained.

In the structure of a normal retrofocus type image forming optical system, a chromatic aberration of magnification tends to occur. Therefore, generally, a material having an appropriate Abbe number is selected for each lens to correct this chromatic aberration of magnification. However, in the image forming optical system having a super-wide angle of view, the height of the off-axial chief ray, incident to the peripheral portion of the image, which is closely related to the occurrence of the chromatic aberration of magnification, becomes high, and, the chromatic aberration of magnification due to the great height of ray significantly affects the performance of the image forming optical system. Therefore, the correction of the aberration can not be fully performed simply by selecting appropriate Abbe numbers.

Thus, the image forming optical system of the sixth type is so constituted, in the basic arrangement, that the third lens is a biconcave negative lens.

In order to prevent the occurrence of the chromatic aberration of magnification, reduction in the height of the off-axial chief ray, incident to the peripheral portion of the image, is effective. Therefore, the entrance pupil position is appropriately set, and in order to lower the height of the off-axial chief ray, incident to the peripheral portion, as the third lens, which is one of the lenses included in the lens unit having the negative refractive power, a biconcave lens is used. When the third is lens thus shaped, the entrance pupil position can be shifted to the object side, and the chromatic aberration of magnification can be effectively corrected. Furthermore, when the height of the off-axial chief ray, incident to the peripheral portion, is reduced, the diameters of the first, the second and the third lenses, which are negative lenses, can be reduced, and the volumes of the lenses can be reduced. As a result, the manufacturing costs for the lenses can be reduced, while at the same time, reductions in the size and the weight of the optical system can also be achieved.

Furthermore, the image forming optical system of the seventh type is so constituted that the composite focal length of the fifth lens and the sixth lens, is positive.

In order to obtain a wide angle of view, a fairly high negative refractive power should be provided for the first lens, the second lens and the third lens constituting the lens unit having a negative refractive power. With this arrangement, however, an aberration occurs at the lens unit having the negative refractive power, and the lens unit having a positive refractive power must be employed to correct this aberration. Especially since the Petzval sum depends on the refractive power, a lens unit having a positive refractive power should be arranged nearer the image side than the lens unit having the negative refractive power, which causes an aberration, otherwise it is difficult to correct a curvature of field. Further, for an optical system having a large angle of view, it is very difficult to correct coma that occurs in the peripheral portion of the image. In order to satisfactorily correct these aberrations, not only is a positive lens employed as the fourth lens, but also a further arrangement should be figured out. Therefore, an arrangement is adopted wherein the composite focal length of the fifth lens and the sixth lens is positive. With this arrangement, the Petzval sum and coma can more appropriately be corrected.

For the image forming optical system of the eighth type, in addition to the above described basic arrangement, an aperture stop is located between the fourth lens and the fifth lens and the following condition (1B) is satisfied.

$$0.3 \leq d4S/Ih \leq 2.5 \qquad (1B)$$

where d4S denotes the axial space from the image side surface of the fourth lens to the aperture stop, and Ih denotes the maximum image height.

Since all of the first lens, the second lens and the third lens constituting the lens unit having the negative refractive power have a negative refractive power, the residual aberrations of the lens unit having the negative refractive power should be corrected by employing the lens unit having the positive refractive power, which is located nearer the image side than the lens unit having the negative refractive power. At the lens unit having the negative refractive power, in addition to coma and astigmatism, especially a chromatic aberration of magnification tends to occur. The occurrence of these aberrations depends not only on the refractive power but also on the height of a ray. Therefore, when a lens having a positive refractive power is employed as the fourth lens, which is adjacent to the lens unit having the negative refractive power, and when the height of an incident ray is appropriately adjusted, the above aberrations can effectively be corrected. Therefore, for the arrangement of the eighth type, the aperture stop is arranged between the fourth lens and the fifth lens, and the condition (1B) is satisfied.

When the ratio exceeds the upper limit provided by the condition (1B), the axial space between the fourth lens and the aperture stop becomes excessive, and the size of the optical system tends to be increased. When the ratio is less than the lower limit, the axial space between the fourth lens and the aperture stop is too small, and the correction of coma and of astigmatism, and especially of a chromatic aberration of magnification, is difficult.

At this time, more preferable is that the following condition (1B') be satisfied.

$$0.5 \leq d4S/Ih \leq 2 \qquad (1B')$$

Further, much more preferable is that the following condition (1B") be satisfied.

$$0.7 \leq d4S/Ih \leq 1.6 \qquad (1B")$$

It should be noted that only the upper limit or the lower limit in either the condition (1B') or (1B") may be employed as the upper limit or the lower limit for the condition (1 B).

For the image forming optical system of the ninth type, the following condition (2B) is satisfied in the above described basic arrangement.

$$-0.7 \leq fN/fP \leq -0.05 \qquad (2B)$$

where fN denotes a focal length of the lens unit having the negative refractive power, and fP denotes a focal length of the lens unit of the positive refractive power.

In order to obtain a wide angle optical system whose half angle of view is more than 90°, the principle point of the optical system must be shifted to a position considerably nearer the image. Therefore, when the retrofocus type image forming optical system is employed, a lens unit having a strong negative refractive power should be arranged on the object side. Thus, the size and the performance of the optical system is varied greatly by the configuration of the lens unit having a positive refractive power that is arranged on the image forming side of the lens unit having the negative refractive power. Therefore, the arrangement wherein the fourth to the seventh lenses satisfies the above described condition (2B) is employed.

When the ratio exceeds the upper limit provided by the condition (2B), the negative refractive power is too strong, and the entire optical system becomes too long. When the ratio is less than the lower limit, the positive refractive power is too strong, and deterioration of coma and astigmatism tends to occur.

More preferable is that the following condition (2B') be satisfied:

$$-0.5 \leq fN/fP \leq -0.1 \qquad (2B')$$

Much more preferable is that the following condition (2B") be satisfied:

$$-0.3 \leq fN/fP \leq -0.15 \qquad (2B")$$

It should be noted that only the upper limit or the lower limit in either the condition (2B') or (2B") may be employed as the upper limit or the lower limit for the condition (2B).

For the image forming optical systems of these sixth to ninth types, for the purpose, for example, of aberration correction, another lens, in addition to the seven basic lenses, may be arranged. However, while taking into account the downsizing of the optical system and a reduction in the number of lenses, it is preferable that a total of seven lenses be employed for the image forming optical system.

For the image forming optical systems of the above described types, more preferable is that the third lens be a biconcave negative lens and that the following condition (3B) be satisfied:

$$2 \leq |r3f/f| \leq 100 \qquad (3B)$$

where r3f denotes the paraxial radius of the curvature of the object side surface of the third lens, and f denotes the focal length of the entire image forming optical system.

When the absolute value exceeds the upper limit provided by the condition (3B), the entrance pupil position is shifted to the image side, so that it is difficult for a chromatic aberration of magnification to be effectively corrected, and the diameter of the lens tends to be increased. When the absolute value is less than the lower limit, the refractive power of the lens is too strong, and coma, astigmatism and a chromatic aberration of magnification tend to be overcorrected.

In this case, more preferable is that the following condition (3B') be satisfied.

$$5 \leq |r3f/f| \leq 50 \qquad (3B')$$

Much more preferable is that the following condition (3B") be satisfied.

$$8 \leq |r3f/f| \leq 50 \qquad (3B")$$

It should be noted that only the upper limit or the lower limit in either the condition (3B') or (3B") may be employed as the upper limit or the lower limit for the condition (3B).

Further, for the image forming optical systems of the above described types, more preferable is that the composite focal length of the fifth lens and the sixth lens be positive and that the following condition (4B) be satisfied:

$$1 \leq f56/f \leq 50 \qquad (4B)$$

where f56 denotes the composite focal length of the fifth lens and the sixth lens, and f denotes the focal length of the entire image forming optical system.

When the ratio exceeds the upper limit provided by the condition (4B), only small corrective effects are obtained by the positive refractive power of the fifth and sixth lenses, and the curvature of field and coma tend to be undercorrected. When the ratio is less than the lower limit, excessive corrective effects are obtained by the positive refractive power of the fifth and sixth lenses, and the curvature of field and coma tend to be overcorrected.

More preferable is that the following condition (4B') be satisfied.

$$5 \leq f56/f \leq 25 \qquad (4B')$$

Much more preferable is that the following condition (4B") be satisfied.

$$5.5 \leq |f56/f| \leq 15 \qquad (4B")$$

It should be noted that only the upper limit or the lower limit in either the condition (4B') or (4B") may be employed as the upper limit or the lower limit for the condition (4B).

Further, for the image forming optical systems of the above described types, more preferable is that the following condition (5B) is satisfied:

$$0.3 \leq f1/f2 \leq 1.7 \qquad (5B)$$

where f1 denotes the focal length of the first lens, and f2 denotes the focal length of the second lens.

When this condition (5B) is satisfied, the first and second lenses can effectively perform the function for bending rays that enter for a wide angle of view.

When the ratio exceeds the upper limit provided by the condition (5B), the refractive power of the first lens becomes too strong and it is difficult to correct coma and astigmatism. Or, the refractive power of the second lens becomes too weak and the lens diameter is increased, or correction of a chromatic aberration of magnification is difficult. When the ratio is less than the lower limit provided by the condition (5B), the refractive power of the first lens becomes too weak, and the lens diameter is increased or correction of the chromatic aberration of magnification is difficult. Or the refractive power of the second lens is too strong and correction of coma and astigmatism is difficult.

In this case, preferable is that the following condition (5B') be satisfied.

$$0.6 \leq f1/f2 \leq 1.5 \qquad (5B')$$

More preferable is that the following condition (5B") be satisfied.

$$0.65 \leq f1/f2 \leq 1.2 \quad (5B")$$

It should be noted that only the upper limit or the lower limit in either the condition (5B') or (5B") may be employed as the upper limit or the lower limit for the condition (5B).

In addition, for the image forming optical systems of the above described types, more preferable is that the following condition (6B) is satisfied:

$$-5 \leq f3/Ih \leq -1 \quad (6B)$$

where f3 denotes the focal length of the third lens and Ih denotes the maximum image height.

A light flux incident to the image forming optical system is diverged and made thick by the lens unit having the negative refractive power, which is constituted by three successively arranged lenses that have negative refractive power. Among these lenses in the lens unit having the negative refractive power that provides this action, the third lens arranged nearest the image is especially important for aberration correction. Thus, it is preferable that the image forming optical system satisfy the condition (6B) that defines the refractive power of the third lens.

When the ratio exceeds the upper limit provided by the condition (6B), the refractive power of the third lens becomes too weak, and the entire image forming optical system becomes too long. Or the refractive powers of the first and the second lenses become too strong relative to the refractive power of the third lens, and it is difficult to correct the chromatic aberration of magnification. When the ratio is less than the lower limit, the refractive power of the third lens becomes too strong and it is difficult to correct coma. Or the refractive powers of the first and second lenses become too weak relative to the refractive power of the third lens, and the lens diameters are increased.

At this time, more preferable is that the following condition (6B') be satisfied.

$$-3.5 \leq f3/Ih \leq -1.5 \quad (6B')$$

Much more preferable is that the following condition (6B") be satisfied.

$$-3.2 \leq f3/Ih \leq -1.7 \quad (6B")$$

It should be noted that only the upper limit or the lower limit in either the condition (6B') or (6B") may be employed as the upper limit or the lower limit for the condition (6B).

Also, for the image forming optical systems of the above described types, it is preferable that the following condition (7B) be satisfied:

$$-0.7 \leq fN/f4 \leq -0.1 \quad (7B)$$

where fN denotes the focal length of the lens unit having the negative refractive power and f4 denotes the focal length of the fourth lens.

In order to appropriately correct aberrations due to the lens unit having the negative refractive power, it is more preferable that the fourth lens, which has a positive refractive power and is arranged on the image forming side of the lens unit having the negative refractive power, satisfy the condition (7B).

When the ratio exceeds the upper limit provided by the condition (7B), the refractive power of the fourth lens becomes too weak, and coma and the chromatic aberration of magnification tend to be undercorrected. When the ratio is less than the lower limit, the refractive power of the fourth lens becomes too strong, and coma and the chromatic aberration of magnification tend to be overcorrected.

At this time, more preferable is that the following condition (7B') be satisfied.

$$-0.5 \leq fN/f4 \leq -0.15 \quad (7B')$$

Much more preferable is that the following condition (7B") be satisfied.

$$-0.4 \leq fN/f4 \leq -0.2 \quad (7B")$$

It should be noted that only the upper limit or the lower limit in either the condition (7B') or (7B") may be employed as the upper limit or the lower limit for the condition (7B).

Further, for the image forming optical systems of the above described types, it is preferable that the following condition (8B) be satisfied $$-0.5 \leq f/r5f \leq 1 \quad (8B)$$

where f denotes the focal length of the entire image forming optical system and r5f denotes the paraxial radius of curvature of the object side surface of the fifth lens.

When the ratio exceeds the upper limit provided by the condition (8B), the object side surface of the fifth lens becomes a strong convex surface. Therefore, the spherical aberration and coma, which occurs because a negative lens is arranged as the fifth lens, tends to be undercorrected, and thus, correction of these aberrations is difficult. When the ratio is less than the lower limit, the object side surface of the fifth lens becomes a strong concave surface, and the spherical aberration and coma, which occurs because a negative lens is arranged as the fifth lens, tends to be overcorrected. Further higher order aberrations also easily occur.

In this case, more preferable is that the following condition (8B') be satisfied.

$$-0.25 \leq f/r5f \leq 0.5 \quad (8B')$$

Much more preferable is that the following condition (8B") be satisfied.

$$-0.15 \leq f/r5f \leq 0.3 \quad (8B")$$

Further, more preferable is that the following condition (8B''') be satisfied.

$$-0.08 \leq f/r5f \leq 0.2 \quad (8B''')$$

It should be noted that only the upper limit or the lower limit in either the condition (8B') or (8B") or (8B''') may be employed as the upper limit or the lower limit for the condition (8B).

Furthermore, for the image forming optical systems of the above types, it is preferable that the following condition (9B) be satisfied:

$$3 \leq f7/Ih \leq 15 \quad (9B)$$

where f7 denotes the focal length of the seventh lens and Ih denotes the maximum image height.

In the image forming optical systems of the sixth to ninth types, since for a light flux incident to the seventh lens, which is arranged nearest the image, rays have a great height, this characteristic greatly influences correction of aberrations in the peripheral portion of the image. Therefore, it is preferable that the image forming optical system satisfy the condition (9B) that defines the refractive power of the seventh lens.

When the ratio exceeds the upper limit provided by the condition (9B), the refractive power of the seventh lens becomes too weak, and correction of a chromatic aberration of magnification is difficult. When the ratio is less than the lower limit, the refractive power of the seventh lens becomes too strong, and as when the ratio exceeds the upper limit, correction of the chromatic aberration of magnification is difficult. Or the refractive power of the sixth lens becomes relatively too weak and coma tends to occur.

In this case, more preferable is that the following condition (9B') be satisfied.

$$3.5 \leq f1/Ih \leq 10 \tag{9B'}$$

Much more preferable is that the following condition (9B") be satisfied.

$$4.0 \leq f1/Ih \leq 8.0 \tag{9B"}$$

It should be noted that only the upper limit or the lower limit in either the condition (9B') or (9B") may be employed as the upper limit or the lower limit of the condition (9B).

Also preferable for the image forming optical systems of the above described types is that an aperture stop be arranged between the fourth lens and the fifth lens.

Generally, in a vehicular mounted camera, a surveillance camera, or the like, the light receiving surface of an image sensor, such as a CCD image sensor or a CMOS image sensor, is located at the image forming surface position of the image forming optical system. Therefore, a ray exit from the optical system should be as perpendicular as possible to the image forming surface. Further, when the image forming optical system is a wide-angle optical system having a very large angle of view, it is preferable that an aperture stop be arranged at an appropriate location in order to obtain an appropriate height for a ray to correct a chromatic aberration of magnification. Therefore, the aperture stop should be arranged between the fourth lens and the fifth lens.

Furthermore, for the image forming optical systems of the above types, it is more preferable that the fifth lens and the sixth lens be cemented together and the cemented surface have a negative refractive power, and that the Abbe number of the fifth lens be smaller than the Abbe number of the sixth lens.

For the image forming optical systems of the above described types, an axial chromatic aberration tends to occur at the fourth lens, which is a positive lens. Therefore, it is preferable that the fifth lens and the sixth lens be cemented so as to provide a cemented surface having a negative refractive power, and that the Abbe number of the fifth lens, which is a negative lens, be smaller than the Abbe number of the sixth lens, which is a positive lens, so that an axial chromatic aberration can occur at the cemented surface in the direction opposite that of the axial chromatic aberration that occurs at the fourth lens.

Further, for the image forming optical systems of the above sixth to the ninth types, when a lens component is defined as a "lens for which only the surface on the incidence side and the surface on the exit side contact air near the optical axis, and no air space exists therebetween", i.e., defined as a single lens element or a cemented lens, it is preferable that six lens components, i.e., the first lens, the second lens, the third lens, the fourth lens, a lens formed by cementing the fifth lens and the sixth lens, and the seventh lens be arranged successively in order from the object side, with air spaces between the respective lenses, or five lens components, i.e., the first lens, the second lens, a lens formed by cementing the third lens and the fourth lens, a lens formed by cementing the fifth lens and the sixth lens, and the seventh lens be arranged successively in order from the object side, with air spaces between the respective lenses.

When this arrangement is employed for the image forming optical system of each type, the functions of the described lenses can be effectively utilized, and the correction of aberrations and a reduction in the size can be easily obtained while the system provides a wide angle of view.

Furthermore, for the image forming optical systems of the above sixth to the ninth types, it is preferable that the maximum half angle of view satisfy the following condition (10B):

$$80° \leq \omega \leq 120° \tag{10B}$$

where ω denotes the maximum half angle of view for an image forming optical system.

When the maximum half angle of view exceeds the upper limit provided by the condition (10B), coma tends to be degraded, and the improvement of image quality is difficult. When the maximum half angle of view is less than the lower limit, the field of view is narrowed, causing a blind spot, and a case tends to occur wherein an image pickup range, required for a surveillance camera, a vehicular camera, or the like, can not be obtained.

At this time, it is more preferable that the following condition (10B') be satisfied.

$$85° \leq \omega \leq 110° \tag{10B'}$$

Much more preferable is that the following condition (10B") be satisfied.

$$92° \leq \omega \leq 107° \tag{10B"}$$

It should be noted that only the upper limit or the lower limit in either the condition (10B') or (10B") may be employed as the upper limit or the lower limit for the condition (10B).

In addition, it is preferable for the image forming optical systems of the above described types that the third lens and the fourth lens be cemented together.

Since the third lens, which is a negative lens, and the fourth lens, which is a positive lens, are cemented, a chromatic aberration of magnification that occurs at the first and second lenses, which are negative lenses, can be effectively corrected.

As for a specific arrangement for the image forming optical systems of the above described types, the first lens is a negative meniscus lens, the convex surface of which is directed toward the object side; the second lens is a negative meniscus lens, the convex surface of which is directed toward the object side; the third lens is a negative lens, for which the absolute value of the paraxial radius of curvature of the image side surface is smaller than the absolute value of the paraxial radius of curvature of the object side surface; the fourth lens is a biconvex positive lens; the fifth lens is a negative lens, for which the absolute value of the paraxial radius of curvature of the image side surface is smaller than the absolute value of the paraxial radius of curvature of the object side surface; the sixth lens is a biconvex positive lens, which is cemented to the fifth lens; and the seventh lens is a positive lens having a convex surface on the object side. For this arrangement, it is preferable that an aperture stop be arranged between the fourth lens and the fifth lens.

By employing this arrangement, aberrations can be satisfactorily corrected while a wider angle of view is obtained, and securing of telecentricity is also easily achieved. Further, since the first lens, the second lens and the third lens constituting the lens unit having the negative refractive power have the above described shapes, the off-axial light flux can be gradually refracted, and a wide angle of view can be obtained while preventing the occurrence of aberrations. Further, since the fourth lens has the above described shape, the two convex surfaces are employed to reduce the degree of divergence of the axial light flux and the off-axial light flux, or to cause these light fluxes to converge. Thus, an aberration that occurs due to the lens unit that has the negative refractive power can be reduced. In addition, since the fifth lens, the sixth lens and the seventh lens, which are arranged following the aperture stop, have the above described shapes, the light flux is bent so as to be near the telecentric state. At this time, in order to appropriately correct a chromatic aberration using the fifth lens and the sixth lens, the curvature of the cemented surface are increased. Also, in order to prevent the occurrence of an aberration, the image side surface of the sixth lens and the two surfaces of the seventh lens have the positive refractive power.

When the third lens and the fourth lens are to be cemented together, it is preferable that, in order to easily correct a chromatic aberration of magnification, the absolute value of the paraxial radius of curvature of the object side surface of the fourth lens be smaller than that of the image side surface. When the third and fourth lenses are not to be cemented, it is preferable that, in order to prevent a spherical aberration, the absolute value of the paraxial radius of curvature of the object side surface of the fourth lens be greater than that of the image side surface.

Further, for the image forming optical systems of the above described types, it is more preferable that the first lens, which is a negative lens, the second lens, which is a negative lens, the third lens, which is a negative lens, the fourth lens, which is a positive lens, the fifth lens, which is a negative lens, the sixth lens, which is a positive lens, and the seventh lens, which is a positive lens, be arranged successively from the object side, and that the third lens and the fourth lens be cemented together.

With this arrangement, a small wide-angle image forming optical system can be provided that can easily prevent the occurrence of a chromatic aberration.

When the image forming optical system of each of the sixth to the ninth types is applied for an image pickup apparatus, it is preferable that the light receiving surface of an electronic image sensor be arranged on the exit side of the image forming optical system, and that an optical image, formed by the image forming optical system, be received at the light receiving surface and be converted into an electrical signal.

When one of the above described image forming optical systems is employed for an image pickup apparatus, telecentricity can be obtained, so that for the image pickup apparatus, an adverse affect can be removed when a ray enters the image sensor obliquely. In this case, for the image forming optical system, the maximum image height Ih defines half the diagonal length of the effective image pickup area of the light receiving surface of the image sensor. The effective image pickup area means the maximum range of the image pickup area, on the photo-electric conversion surface (light receiving surface) of the electronic image sensor, by which the image signal used for displaying or printing is received.

For the image forming optical systems of the above sixth to the ninth types, more preferable is that a plurality of the various characteristics described above be established at the same time, because these effects can be simultaneously obtained.

Numerical examples 5 through 8 will now be described.

According to data tables for numerical examples 5 through 8, as well as for numerical examples 1 through 4, R denotes the radius of curvature of the surface of each lens; D denotes the thickness of each lens or the space between the lens surfaces; Nd denotes a refractive index for the wavelength of d-line of each lens; Vd denotes the Abbe number for the wavelength of d-line of each lens; K denotes a conic constant; and $A_4$, $A_6$, $A_8$ and $A_{10}$ denote aspherical coefficients.

Further, the shape of an aspherical surface is represented by the following expression using the conic constant and the aspherical coefficients, where Z denotes the coordinate in the direction of the optical axis, and Y denotes the coordinate in the direction perpendicular to the optical axis.

$$Z=(Y^2/r)/[1+\{1-(1+k)\cdot(Y/r)^2\}^{1/2}]+A_4Y^4+A_6Y^6+A_8Y^8+A_{10}Y^{10}$$

Furthermore, according to each numerical example, the image height and the angle of view are almost proportional to each other, due to the occurrence of distortion, and the similar property as that of a so-called f-θ lens is obtained. It should be noted that an ideal image height is employed as a reference in defining the distortion, and thus, when the half angle of view is equal to or greater than 90°, the value of the distortion can not be defined. Therefore, for a distortion, the curve is cut off at the view angle of 90°, and for a larger view angle, no curve portion is shown.

Example 5

Figure 9:
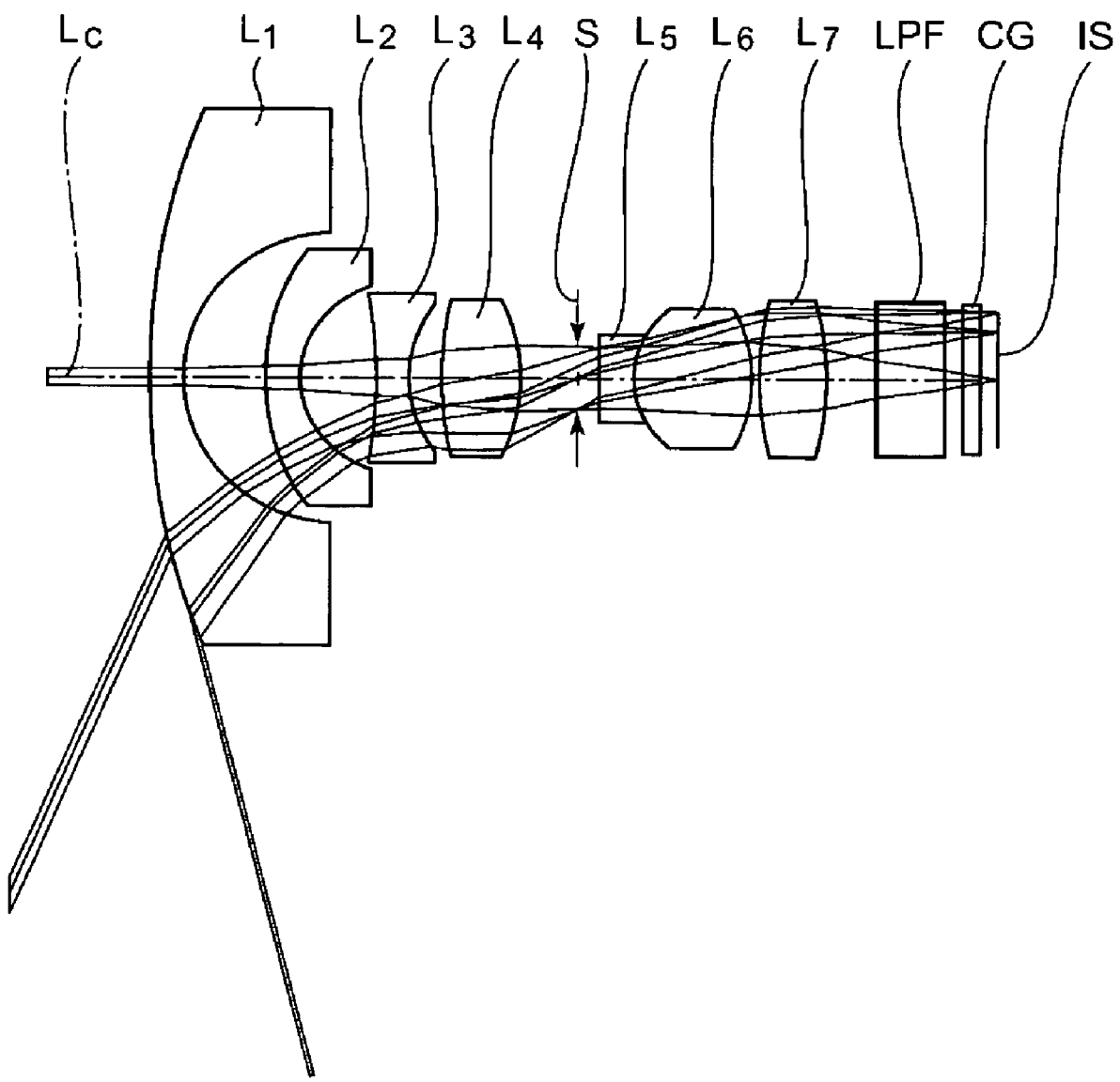
FIG. 9 is a cross-sectional view of example 5 of the present invention, taken along a surface including an optical axis.
Figure 10:
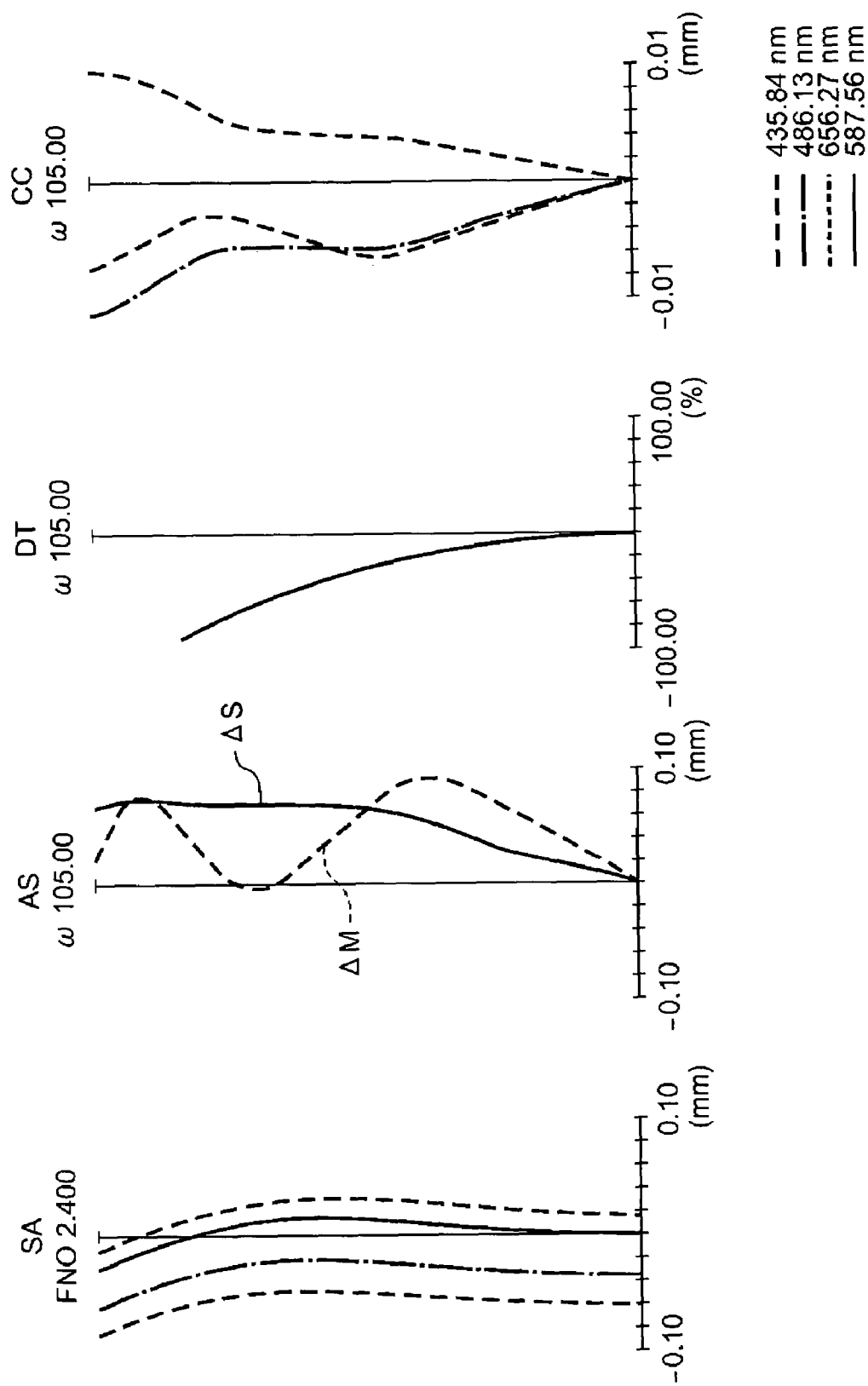
FIG. 10 is aberration diagrams for example 5.

FIG. 9 is a cross-sectional view of an image forming optical system of example 5, taken along the surface that includes the optical axis. FIG. 10 is an aberration diagram of example 5. SA denotes a spherical aberration, AS denotes astigmatism, DT denotes a distortion, CC denotes a chromatic aberration of magnification, ω denotes a half angle of view, and FNO denotes an F number.

As shown in FIG. 9, this image forming optical system includes, in order from the object side, a first lens $L_1$, a second lens $L_2$, a third lens $L_3$, a fourth lens $L_4$, an aperture stop S, a fifth lens $L_5$, a sixth lens $L_6$, a seventh lens $L_7$, a low pass filter LPF, which has an IR cut coating on the surface thereof, and a cover glass CG.

The first lens $L_1$ is a negative meniscus lens, the convex surface of which is directed toward the object side. The second lens $L_2$ is a negative meniscus lens, the convex surface of which is directed toward the object side. The third lens $L_3$ is a biconcave negative lens, the fourth lens $L_4$ is a biconvex positive lens, the fifth lens $L_5$ is a biconcave negative lens, the sixth lens $L_6$ is a biconvex positive lens, and the seventh lens $L_7$ is also a biconvex positive lens. The fifth lens $L_5$ and the sixth lens $L_6$ are cemented, and both surfaces of the seventh lens $L_7$ are aspherical. Further, the seventh lens $L_7$ is made of a material of amorphous polyolefin type, ZEONEX®.

For example 5, the focal length is 1.25 mm, the maximum image height is 2.01 mm, the half angle of view is 105° and the F number is 2.400.

The lens data for example 5 are shown below.

TABLE 9

| Surface | R | D | Nd | Vd |
|---|---|---|---|---|
| 1 | 20.3214 | 1.000 | 1.78590 | 44.20 |
| 2 | 4.2461 | 2.405 | | |
| 3 | 6.4906 | 1.000 | 1.62041 | 60.29 |
| 4 | 2.7866 | 2.200 | | |
| 5 | −14.0681 | 1.000 | 1.62041 | 60.29 |
| 6 | 3.6367 | 1.000 | | |
| 7 | 10.2603 | 2.300 | 1.80518 | 25.42 |
| 8 | −4.8061 | 1.780 | | |
| 9(AS) | ∞ | 0.615 | | |
| 10 | −31.8452 | 1.000 | 1.78472 | 25.68 |
| 11 | 2.4643 | 3.500 | 1.60311 | 60.64 |
| 12 | −4.0091 | 0.200 | | |
| 13* | 8.6154 | 2.000 | 1.52542 | 55.78 |
| 14* | −8.8168 | 1.379 | | |
| 15 | ∞ | 2.081 | 1.51633 | 64.14 |
| 16 | ∞ | 0.520 | | |
| 17 | ∞ | 0.520 | 1.51633 | 64.14 |
| 18 | ∞ | 0.500 | | |
| 19(IS) | ∞ | | | |

*Aspherical surface
(AS): Aperture stop
(IS): Image surface

TABLE 10

| | | | Aspherical coefficients | | | |
|---|---|---|---|---|---|---|
| Surface | R | k | $A_4$ | $A_6$ | $A_8$ | $A_{10}$ |
| 13 | 8.615 | 0.000 | $-5.40588 \times 10^{-3}$ | $1.51109 \times 10^{-3}$ | $-2.91534 \times 10^{-4}$ | $3.42809 \times 10^{-5}$ |
| 14 | -8.817 | 0.000 | $-3.08060 \times 10^{-3}$ | $9.16385 \times 10^{-5}$ | $3.96691 \times 10^{-5}$ | $5.94217 \times 10^{-6}$ |

Example 6

Figure 11:
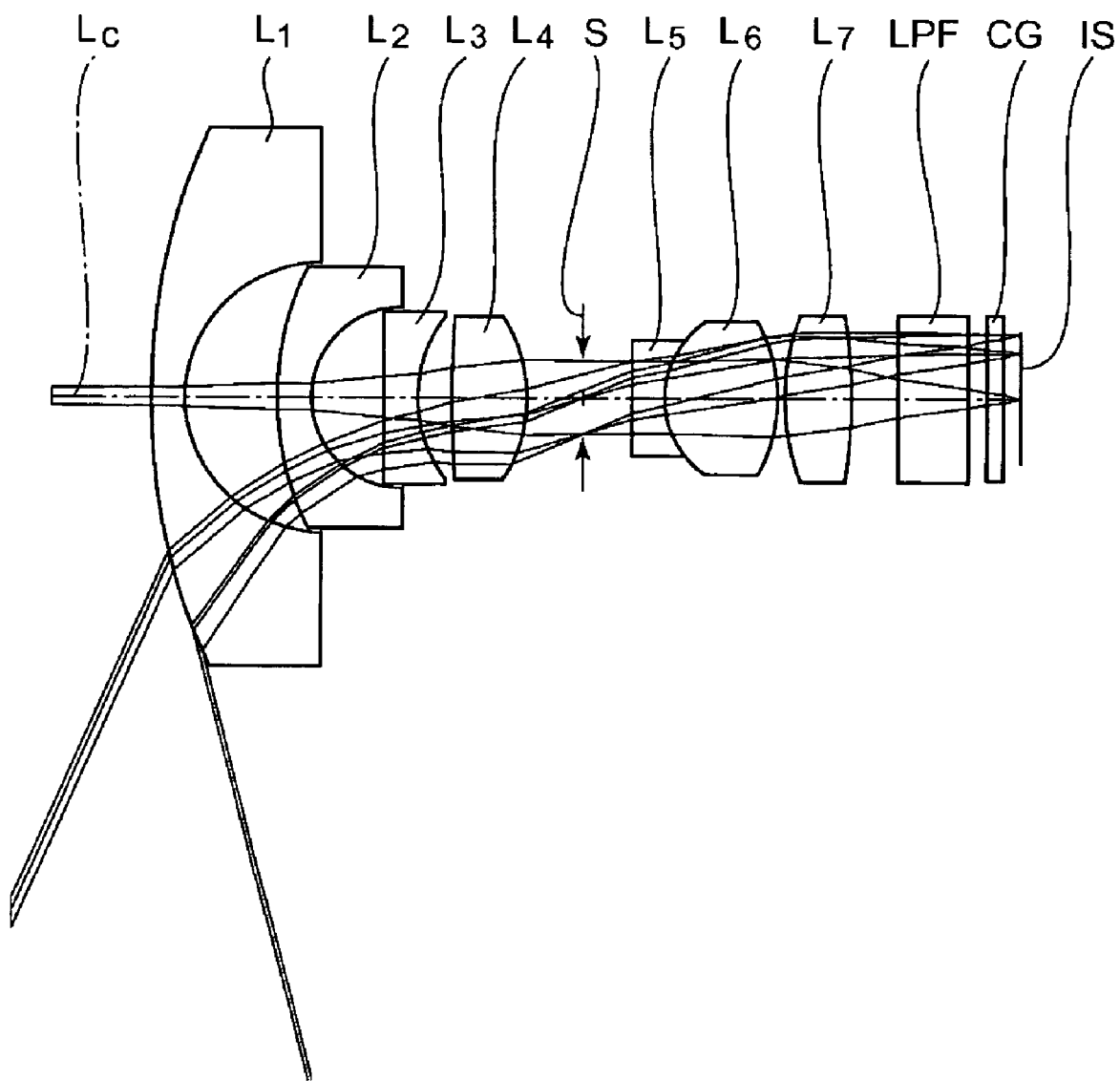
FIG. 11 is a cross-sectional view of example 6 of the present invention, taken along a surface including an optical axis.
Figure 12:
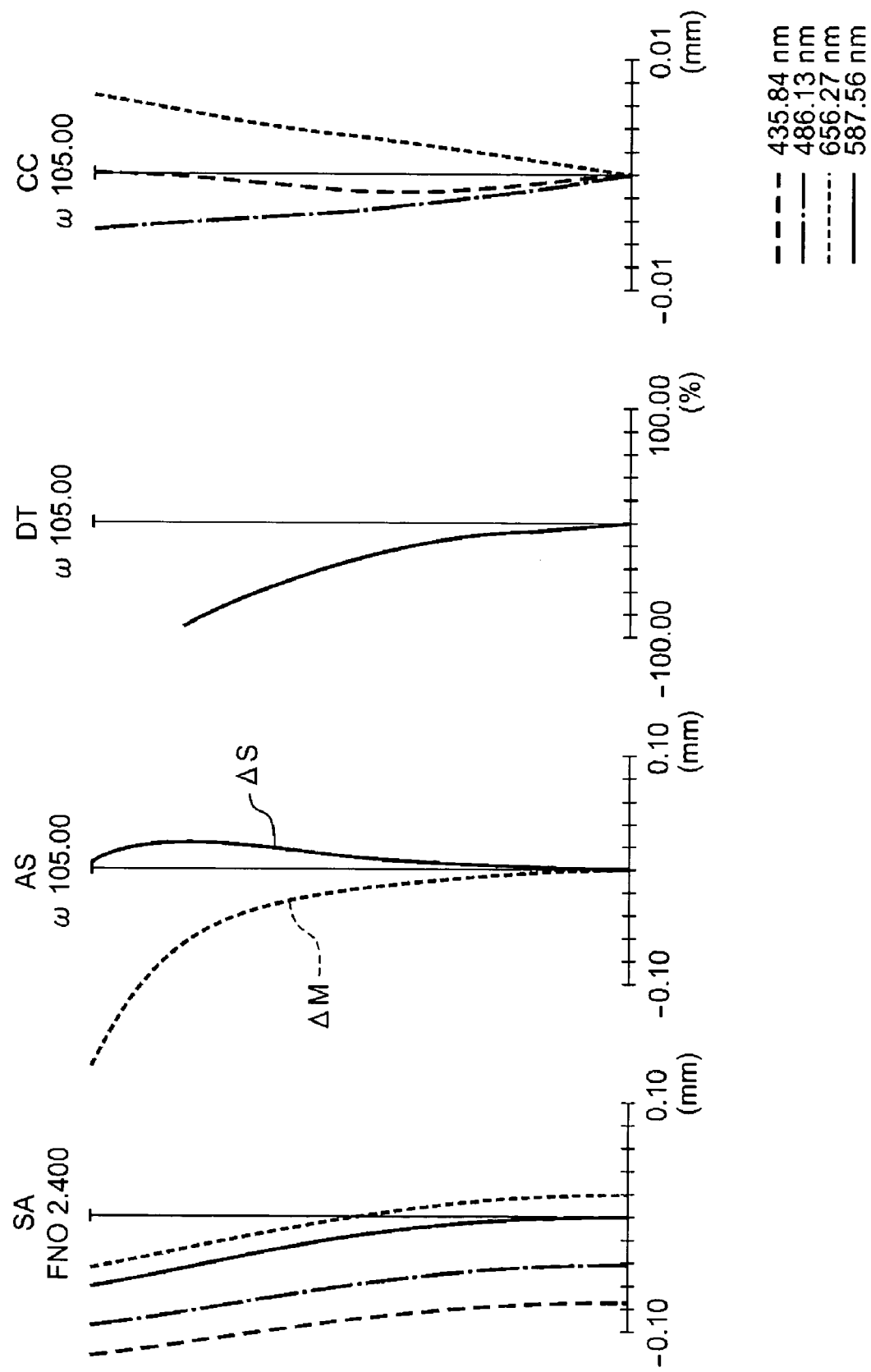
FIG. 12 is aberration diagrams for example 6.

FIG. 11 is a cross-sectional view of an image forming optical system of example 6, taken along the surface that includes the optical axis. FIG. 12 is an aberration diagram of example 6. SA denotes a spherical aberration, AS denotes astigmatism, DT denotes a distortion, CC denotes a chromatic aberration of magnification, ω denotes a half angle of view, and FNO denotes an F number.

As shown in FIG. 11, this image forming optical system includes, in order from the object side, a first lens $L_1$, a second lens $L_2$, a third lens $L_3$, a fourth lens $L_4$, an aperture stop S, a fifth lens $L_5$, a sixth lens $L_6$, a seventh lens $L_7$, a low pass filter LPF, which has an IR cut coating on the surface thereof, and a cover glass CG.

The first lens $L_1$ is a negative meniscus lens, the convex surface of which is directed toward the object side. The second lens $L_2$ is a negative meniscus lens, the convex surface of which is directed toward the object side. The third lens $L_3$ is a biconcave negative lens, the fourth lens $L_4$ is a biconvex positive lens, and the fifth lens $L_5$ is a negative lens, the convex surface of which is directed toward the object side. The sixth lens $L_6$ is a biconvex positive lens, and the seventh lens $L_7$ is also a biconvex positive lens. The fifth lens $L_5$ and the sixth lens $L_6$ are cemented, and the surfaces of all the lenses are spherical.

For example 6, the focal length is 1.25 mm, the maximum image height is 2.00 mm, the half angle of view is 105° and the F number is 2.400.

The lens data for example 6 are shown below.

TABLE 11

| Surface | R | D | Nd | Vd |
|---|---|---|---|---|
| 1 | 19.3535 | 1.000 | 1.78590 | 44.20 |
| 2 | 4.0773 | 2.760 | | |
| 3 | 9.0859 | 1.000 | 1.65160 | 58.55 |
| 4 | 2.7499 | 2.200 | | |
| 5 | -118.2435 | 1.000 | 1.62041 | 60.29 |
| 6 | 3.9697 | 1.000 | | |
| 7 | 27.2010 | 2.300 | 1.80518 | 25.42 |
| 8 | -4.6638 | 1.698 | | |
| 9(AS) | ∞ | 1.442 | | |
| 10 | 38.9491 | 1.000 | 1.78472 | 25.68 |
| 11 | 2.7504 | 3.400 | 1.60311 | 60.64 |
| 12 | -4.5678 | 0.200 | | |
| 13 | 7.0225 | 2.000 | 1.48749 | 70.23 |
| 14 | -18.9282 | 1.379 | | |
| 15 | ∞ | 2.081 | 1.51633 | 64.14 |
| 16 | ∞ | 0.520 | | |
| 17 | ∞ | 0.520 | 1.51633 | 64.14 |
| 18 | ∞ | 0.500 | | |
| 19(IS) | ∞ | | | |

(AS): Aperture stop
(IS): Image surface

Example 7

Figure 13:
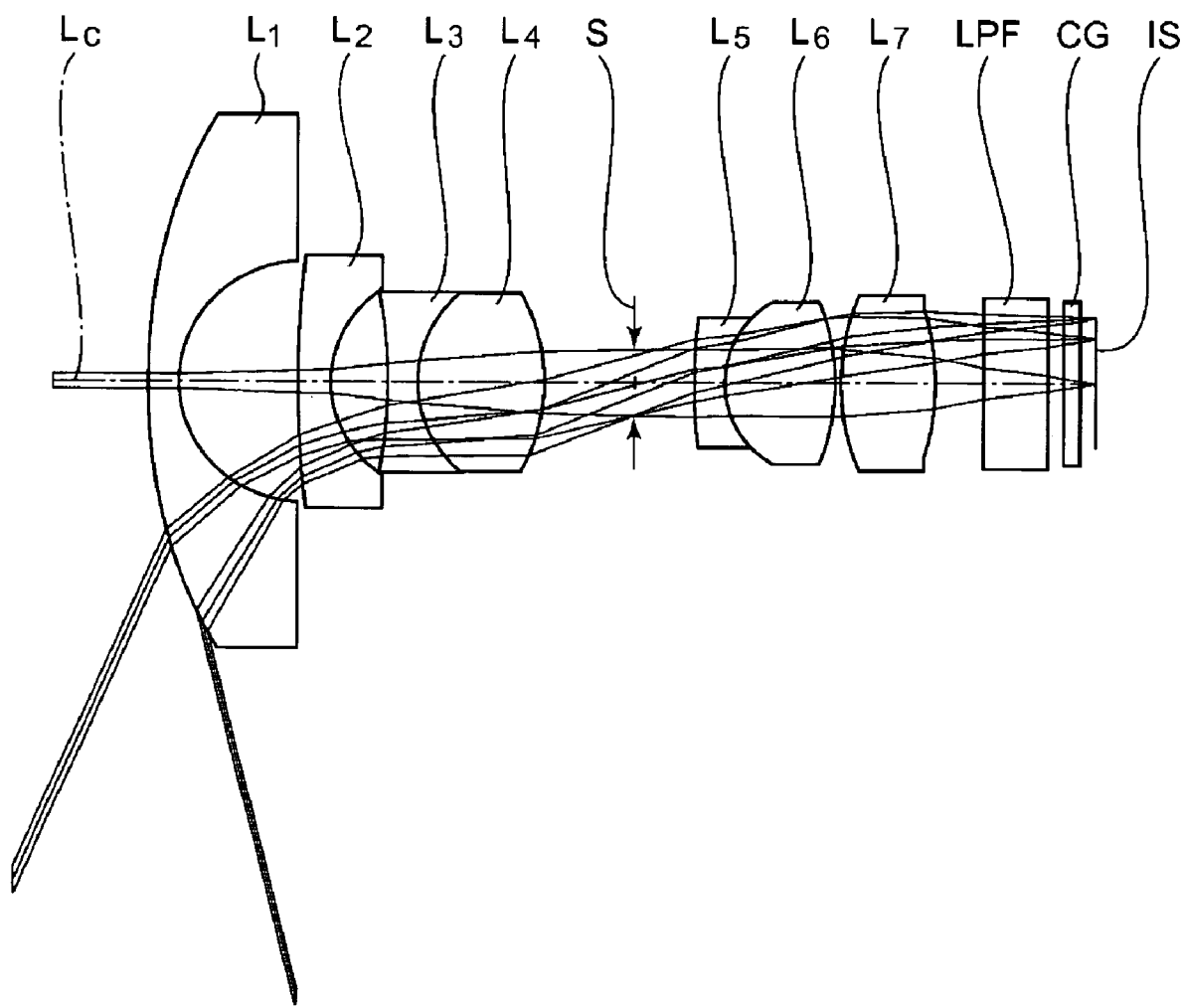
FIG. 13 is a cross-sectional view of example 7 of the present invention, taken along a surface including an optical axis.
Figure 14:
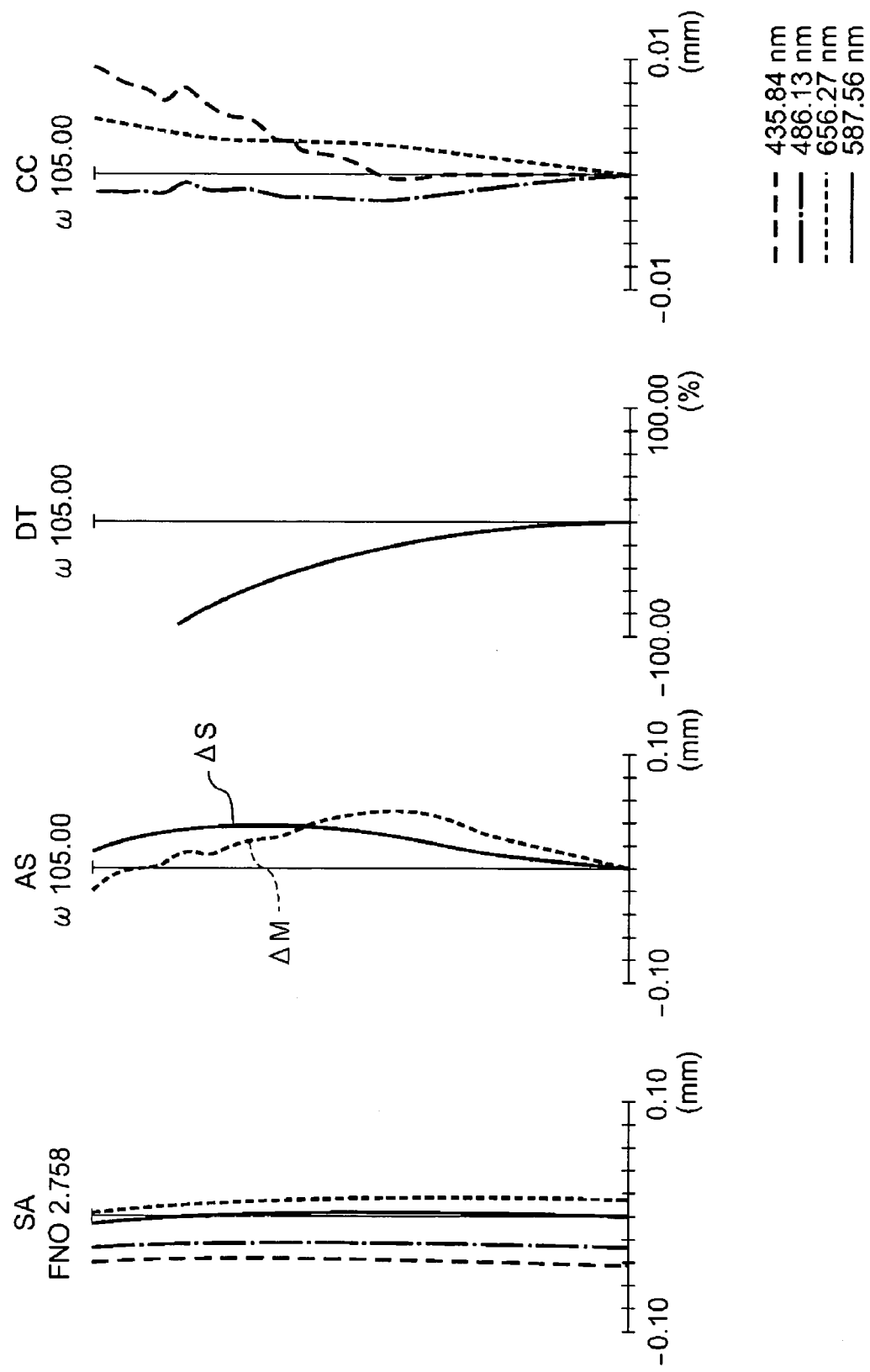
FIG. 14 is aberration diagrams for example 7.

FIG. 13 is a cross-sectional view of an image forming optical system of example 7, taken along the surface that includes the optical axis. FIG. 14 is an aberration diagram of example 7. SA denotes a spherical aberration, AS denotes astigmatism, DT denotes a distortion, CC denotes a chromatic aberration of magnification, ω denotes a half angle of view, and FNO denotes an F number.

As shown in FIG. 13, this image forming optical system includes, in order from the object side, a first lens $L_1$, a second lens $L_2$, a third lens $L_3$, a fourth lens $L_4$, an aperture stop S, a fifth lens $L_5$, a sixth lens $L_6$, a seventh lens $L_7$, a low pass filter LPF, which has an IR cut coating on the surface thereof, and a cover glass CG.

The first lens $L_1$ is a negative meniscus lens, the convex surface of which is directed toward the object side. The second lens $L_2$ is a negative meniscus lens, the convex surface of which is directed toward the object side. The third lens $L_3$ is a biconcave negative lens, the fourth lens $L_4$ is a biconvex positive lens, and the fifth lens $L_5$ is a negative lens, the convex surface of which is directed toward the object side. The sixth lens $L_6$ is a biconvex positive lens, and the seventh lens $L_7$ is also a biconvex positive lens. The third lens $L_3$ and the fourth lens $L_4$ are cemented and the fifth lens $L_5$ and the sixth lens $L_6$ are cemented. Both surfaces of the lens $L_7$ are aspherical, and the seventh lens $L_7$ is made of a material of amorphous polyolefin type, ZEONEX®.

For example 7, the focal length is 1.23 mm, the maximum image height is 2.05 mm, the half angle of view is 105° and the F number is 2.400.

The lens data for example 7 are shown below.

TABLE 12

| Surface | R | D | Nd | Vd |
|---|---|---|---|---|
| 1 | 17.8762 | 1.000 | 1.74400 | 44.78 |
| 2 | 3.7932 | 3.830 | | |
| 3 | 38.7777 | 1.000 | 1.74400 | 44.78 |
| 4 | 3.3886 | 1.769 | | |
| 5 | -14.0589 | 1.000 | 1.74400 | 44.78 |
| 6 | 3.3977 | 4.000 | 1.75520 | 27.51 |
| 7 | -6.1004 | 2.910 | | |
| 8(AS) | ∞ | 1.832 | | |
| 9 | 11.6281 | 1.000 | 1.80518 | 25.42 |
| 10 | 2.7831 | 3.500 | 1.62041 | 60.29 |
| 11 | -7.4320 | 0.200 | | |
| 12* | 9.3659 | 2.960 | 1.52542 | 55.78 |
| 13* | -7.3527 | 1.500 | | |
| 14 | ∞ | 2.000 | 1.51633 | 64.14 |
| 15 | ∞ | 0.500 | | |
| 16 | ∞ | 0.500 | 1.51633 | 64.14 |
| 17 | ∞ | 0.500 | | |
| 18(IS) | ∞ | | | |

*Aspherical surface
(AS): Aperture stop
(IS): Image surface

TABLE 13

| | | | Aspherical coefficients | | | |
|---|---|---|---|---|---|---|
| Surface | R | k | $A_4$ | $A_6$ | $A_8$ | $A_{10}$ |
| 12 | 9.366 | 0.000 | $-2.44770 \times 10^{-4}$ | $2.81072 \times 10^{-4}$ | $1.30370 \times 10^{-5}$ | 0 |
| 13 | -7.353 | 0.000 | $1.18015 \times 10^{-3}$ | $-3.77233 \times 10^{-5}$ | $3.55811 \times 10^{-5}$ | $2.80212 \times 10^{-6}$ |

Example 8

Figure 15:
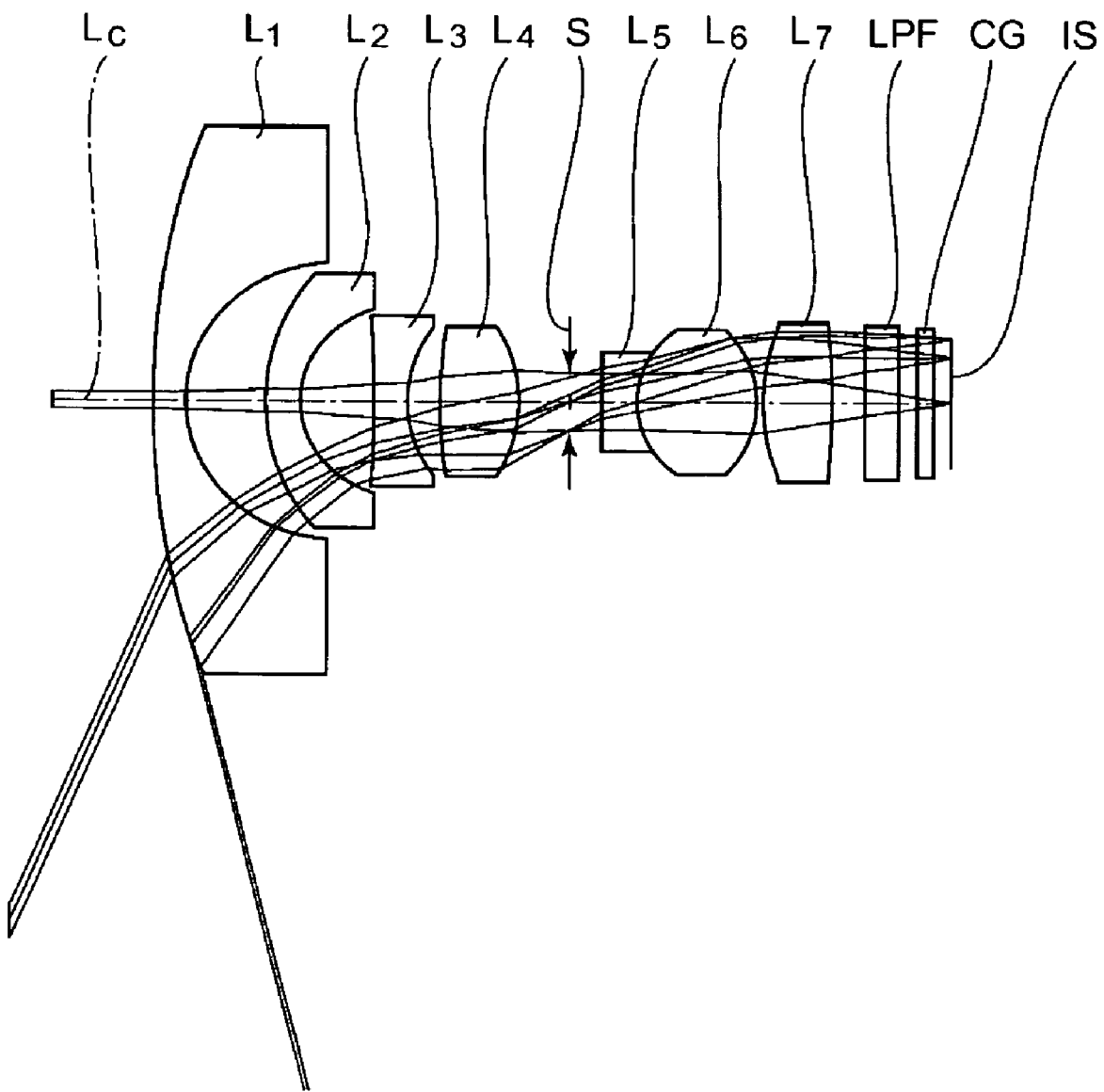
FIG. 15 is a cross-sectional view of example 8 of the present invention, taken along a surface including an optical axis.
Figure 16:
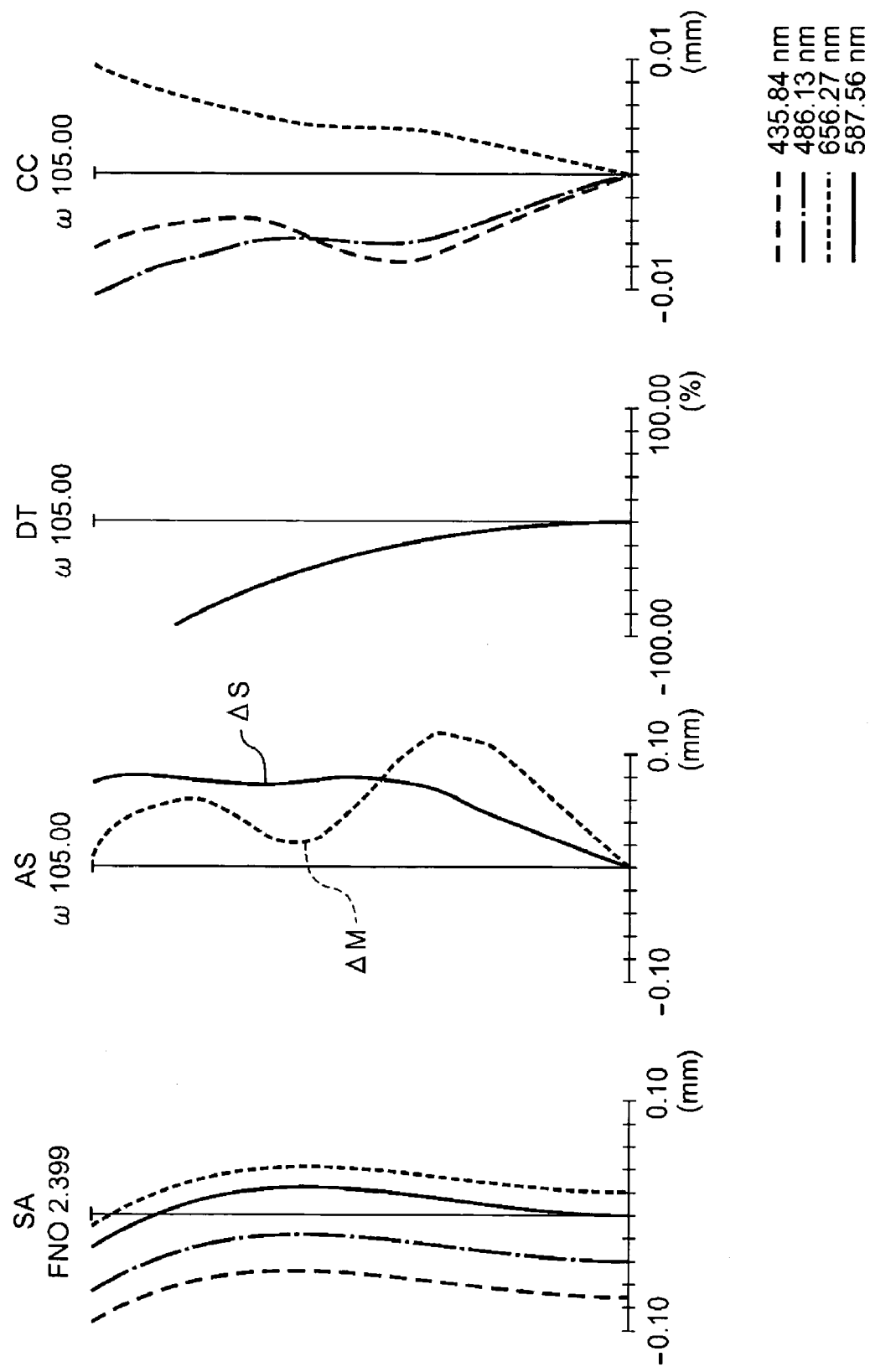
FIG. 16 is aberration diagrams for example 8.

FIG. 15 is a cross-sectional view of an image forming optical system of example 8, taken along the surface that includes the optical axis. FIG. 16 is an aberration diagram of example 8. SA denotes a spherical aberration, AS denotes astigmatism, DT denotes a distortion, CC denotes a chromatic aberration of magnification, ω denotes a half angle of view, and FNO denotes an F number.

As shown in FIG. 15, this image forming optical system includes, in order from the object side, a first lens $L_1$, a second lens $L_2$, a third lens $L_3$, a fourth lens $L_4$, an aperture stop S, a fifth lens $L_5$, a sixth lens $L_6$, a seventh lens $L_7$, a low pass filter LPF, which has an IR cut coating on the surface thereof, and a cover glass CG.

The first lens $L_1$ is a negative meniscus lens, the convex surface of which is directed toward the object side. The second lens $L_2$ is a negative meniscus lens, the convex surface of which is directed toward the object side. The third lens $L_3$ is a biconcave negative lens, the fourth lens $L_4$ is a biconvex positive lens, the fifth lens $L_5$ is a biconcave negative lens, the sixth lens $L_6$ is a biconvex positive lens, and the seventh lens $L_7$ is a positive meniscus lens, the convex surface of which is directed toward the object side. The fifth lens $L_5$ and the sixth lens $L_6$ are cemented, and both surfaces of the lens $L_7$ are aspherical. Further, the seventh lens $L_7$ is made of a material of amorphous polyolefin type, ZEONEX®.

For example 8, the focal length is 1.25 mm, the maximum image height is 2.01 mm, the half angle of view is 105° and the F number is 2.399.

The lens data for example 8 are shown below.

TABLE 14

| Surface | R | D | Nd | Vd |
|---|---|---|---|---|
| 1 | 20.8699 | 1.000 | 1.78590 | 44.20 |
| 2 | 4.2162 | 2.331 | | |
| 3 | 5.7856 | 1.000 | 1.62041 | 60.29 |
| 4 | 2.8433 | 2.200 | | |
| 5 | -53.4948 | 1.000 | 1.62041 | 60.29 |
| 6 | 3.6517 | 1.000 | | |
| 7 | 13.5951 | 2.300 | 1.80518 | 25.42 |
| 8 | -4.6322 | 1.515 | | |
| 9(AS) | ∞ | 0.954 | | |
| 10 | -35.9658 | 1.000 | 1.78472 | 25.68 |
| 11 | 2.6545 | 3.500 | 1.60311 | 60.64 |
| 12 | -3.2420 | 0.200 | | |
| 13* | 4.4322 | 2.000 | 1.52542 | 55.78 |
| 14* | 11.5126 | 1.000 | | |
| 15 | ∞ | 1.000 | 1.51633 | 64.14 |
| 16 | ∞ | 0.500 | | |
| 17 | ∞ | 0.500 | 1.51633 | 64.14 |
| 18 | ∞ | 0.500 | | |
| 19(IS) | ∞ | | | |

*Aspherical surface
(AS): Aperture stop
(IS): Image surface

TABLE 15

| | | | Aspherical coefficients | | | |
|---|---|---|---|---|---|---|
| Surface | R | k | $A_4$ | $A_6$ | $A_8$ | $A_{10}$ |
| 13 | 4.432 | 0.000 | $-1.20178 \times 10^{-2}$ | $3.41289 \times 10^{-3}$ | $-8.30554 \times 10^{-4}$ | $6.57794 \times 10^{-5}$ |
| 14 | 11.513 | 0.000 | $-1.42285 \times 10^{-2}$ | $3.31285 \times 10^{-3}$ | $-7.84349 \times 10^{-4}$ | $6.60923 \times 10^{-5}$ |

Data corresponding to the described conditions in examples 5 to 8 are as shown in the following table 16.

TABLE 16

| | Example | | | |
|---|---|---|---|---|
| Condition | Ex. 5 | Ex. 6 | Ex. 7 | Ex. 8 |
| (1B): d4S/Ih | 0.88 | 0.85 | 1.42 | 0.75 |
| (2B): fN/fP | -0.16 | -0.18 | 0.05 | -0.23 |
| (3B): r3f/f | -11.25 | -94.50 | -11.43 | -42.79 |
| (4B): f56/f | 9.32 | 8.15 | 9.60 | 5.97 |
| (5B): f1/f2 | 0.80 | 1.05 | 1.32 | 0.67 |
| (6B): f3/Ih | -2.26 | -3.08 | -1.75 | -2.71 |
| (7B): fP/f4 | -0.29 | -0.25 | -0.23 | -0.32 |
| (8B): f/r5f | -0.04 | 0.03 | 0.11 | -0.04 |
| (9B): f7/Ih | 4.29 | 5.38 | 4.08 | 6.19 |
| (10B): ω | 105.00° | 105.00° | 105.00° | 105.00° |

In numerical examples 1 to 8, the lenses formed of plastic may be formed of glass and the lenses formed of glass may be formed of plastic. Further, when glass is employed that has a higher refractive index than has the glass employed for the described numerical examples, a higher imaging performance can be obtained. When glass is employed that has a lower refractive index than has the glass employed for the described numerical examples, the cost can be reduced. And when the glass employed is special low dispersing glass, it effectively contributes to the correction of chromatic aberrations. Furthermore, when plastic is employed to form the lenses, a low moisture material is preferable because deterioration in the imaging performance due to environmental change is reduced. In this case, a preferable plastic material is, for example, ZEONEX® (ZEON CORPORATION).

Furthermore, in order to cut down unnecessary light, such as ghost images or flares, a flare stop may be arranged in addition to the aperture stop. In each example, the flare stop can be located on the object side of the first lens, between the first and second lenses, between the second and third lenses, between the third lens and the aperture stop, between the aperture stop and the fourth lens, between the fifth lens and the sixth lens, or between the sixth lens and the image surface. Further, flare light may also be cut down by using a frame that supports the lenses, or by employing another member. Or means to cut down unnecessary light may be provided by directly printing or coating a light shielding material to the image forming optical system, or by adhering a seal thereto. The shape of the means to cut down unnecessary light may be an arbitrary shape, such as a circle, an ellipse, a rectangle, a polygon or a shape enclosed by a functional curve. Further, in addition to unnecessary light, a light flux such as a coma flare in the peripheral portion of the image may also be cut down.

Furthermore, an anti-reflection coating may be applied for the lenses to reduce ghost and flare. Multi-layer thin film coating is preferable because ghost and flare can be effectively reduced. Also, IR cut coating may be applied, for example, on the lens surface and the cover glass.

In addition, each image forming optical system may be designed so as to enable focusing. In this case, focusing may be performed by moving the entire lens system forward or backward, or by moving only part of the lenses forward or backward.

A drop in brightness in the peripheral portion of the image may be reduced by shifting the micro lens array of the CCD image sensor. For example, the design of the micro lens array of the CCD may be changed in consonance with the incidence angle of a ray of each image height. Furthermore, the drop in brightness in the peripheral portion of the image may be corrected by performing image processing.

Moreover, a plastic layer may be formed on the air contact surface of each single lens element and each cemented lens. In this case, when the air contact surface of the plastic layer is an aspherical surface, a more appropriate optical performance is obtained. So long as the thickness of the plastic layer is equal to or less than 1 mm within the effective diameter (it should be noted that the thickness is measured in the normal direction of the lens surface on which the plastic layer is deposited), the plastic layer and the lens on which the plastic layer is deposited, is regarded as a single lens.

When the optical power of the lens unit having the positive refractive power get stronger, it is advantageous for obtaining a wider angle of view. Thus, for the lens unit having the positive refractive power, such a strong refractive power may be provided that the rear focal point thereof is positioned inside the lens unit.

The image forming optical systems described above can be used for the wide-angle image forming optical system whose half angle of view is equal to or greater than 90°, and can also satisfy requirements for downsizing and for improvement of the imaging performance.

The image forming optical systems of the invention can be applied for a vehicular mounted camera, a surveillance camera, a digital camera, a digital video camera, a small camera mounted, for example, on a mobile phone or on a personal computer, and the like.

A vehicular mounted stereo image taking apparatus will now be described as an example of an image pickup apparatus that employs the above described image forming optical system.

Figure 17:
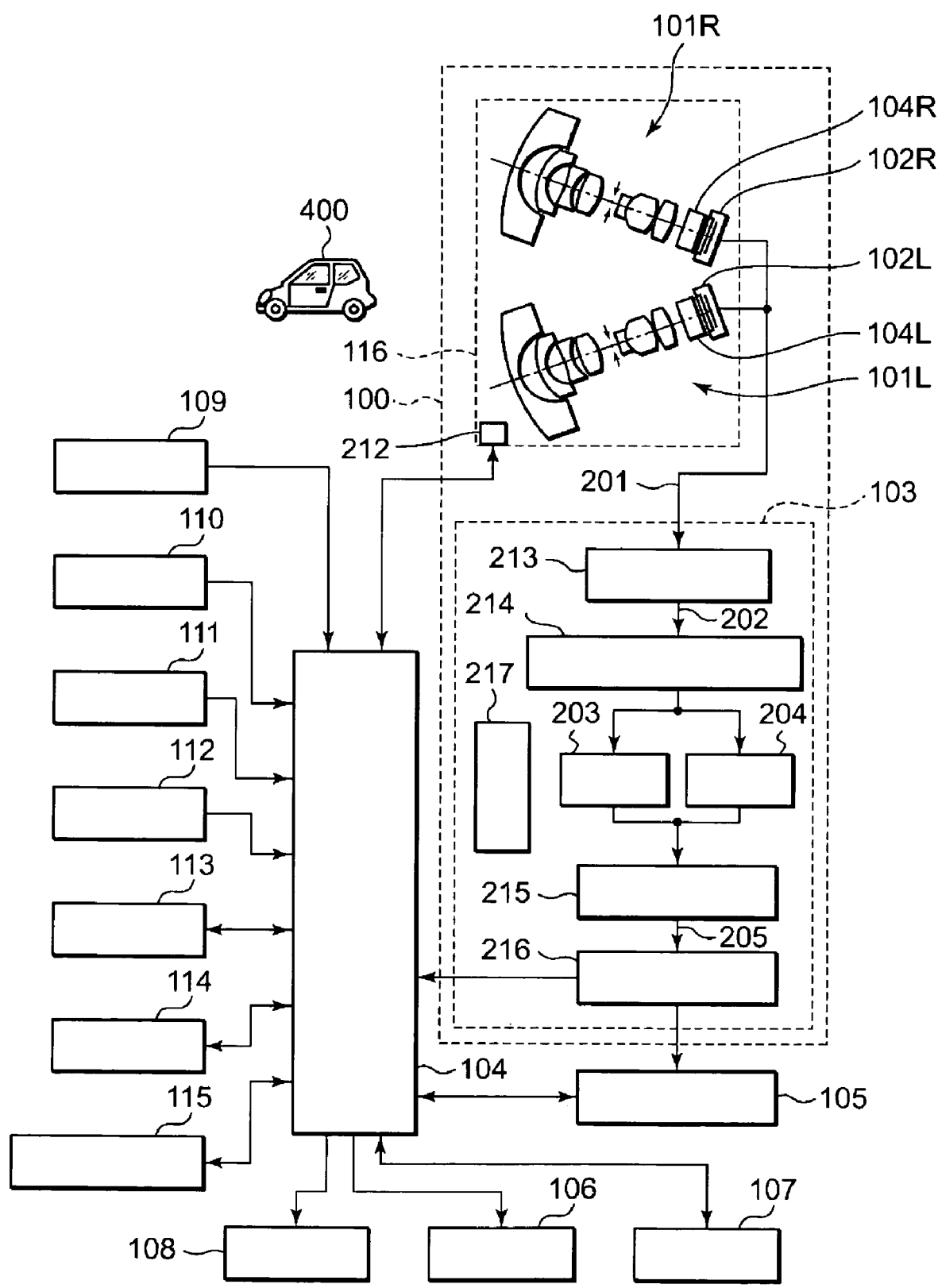
FIG. 17 is a diagram showing the configuration of a stereo image pickup system that includes a stereo image pickup apparatus for employing an image forming optical system according to the present invention.

FIG. 17 is a diagram showing the configuration of a stereo image taking system that includes a stereo image taking apparatus for which the image forming optical system according to the invention is employed. In the following explanation, this stereo image taking system is mounted in a vehicle.

The stereo picture taking system comprises: a range image input section 100, a controller 104, an object recognition apparatus 105, an alarm apparatus 106, an operating apparatus 107, a display apparatus 108, a speed sensor 109, a ranging radar 110, an illuminance sensor 111, an external camera 112, a GPS (Global Positioning System) receiver 113, a VICS (Vehicle Information and Communication System) receiver 114 and an external communication apparatus 115.

The range image input section 100 comprises: a stereo image taking apparatus 116, which includes two image sensors 102L and 102R used for taking an image of an object 400, and image forming optical systems 101L and 101R, which are attached in front of the respective image sensors 102L and 102R; and a range image processor 103, for measuring a range image 205 of the object 400. The image forming optical systems 101L and 101R are arranged so that their optical axes are not parallel, and can thus provide a wide image taking area extended outside the area in which the image taking areas of the image forming optical systems 101L and 101R overlap. In this case, the optical axes of the image forming optical systems 101L and 101R are directed outward and angled away from each other.

The stereo image taking apparatus 116, as well as a general video camera or a digital still camera, includes an aperture diaphragm controller (not shown), a focus controller (not shown), a shutter speed controller (not shown) and a sensitivity controller (not shown) as necessary.

Further, the image forming optical systems 101L and 101R are respectively disposed forward of the filters 104L and 104R, which are arranged in front of the image sensors 102L and 102R. The light that enters the image forming optical systems 101L and 101R passes through the filters 104R and 104L, and the images of the object 400 are formed on the image receiving surfaces of the image sensors 102L and 102R, respectively, by the image forming optical systems 101L and 101R. As a result, images of the object 400 taken from different viewpoints can be obtained by the image sensors 102R and 102L.

A stereo image 201 taken in this manner by the stereo image taking apparatus 116, i.e., obtained by the image sensors 102R and 102L, is transmitted to the range image processor 103, as shown in FIG. 17. The stereo image 201 is processed by the range image processor 103 to obtain a three-dimensional range image 205, which is then transmitted to the controller 104 and the object recognition apparatus 105.

It should be noted that the term "range image" defines an object image which includes distance information in each of the pixels.

In FIG. 17, an exposure controller 212 is connected to the aperture diaphragm controller, the shutter speed controller and the sensitivity controller (none of them shown) provided for the stereo image taking apparatus 116. The exposure controller 212 is also connected to the controller 104. The operation of the stereo image taking apparatus 116 is controlled by the controller 104 in accordance with an exposure value calculated based on the luminance information obtained by the image sensor 102L and/or 102R.

Further, as described above, the stereo image 201 obtained by the image sensors 102R and 102L is received by the range image processor 103. The stereo image 201 is transmitted to the frame memory 213 and converted into a digital image 202 that is output to the rectification device 214. Thereafter, the rectification device 214 transmits a left image 203 and a right image 204 to the distance calculation device 215. Then the distance calculation device 215 transmits the three-dimensional image 205 to the object recognition apparatus 105, through the range image output unit 216, and also transmits the stereo image 201 and the range image 205 to the controller 104.

The range image processor 103 also includes a calibration device 217, which outputs a rectification parameter to the rectification device 214, a distance calculation parameter to the distance calculation device 215 and an object recognition parameter to the object recognition apparatus 105. The object recognition apparatus 105 employs the received three-dimensional range image 205 to identify an object or an object area present in the image 205, and outputs identified object data (not shown).

The above mentioned devices included in the range image processor 103 may be provided by using software installed in a computer.

The controller 104 has a role in integrating image information and vehicle information and, for example, displays on the display apparatus 108 the results obtained by the range image processor 103; analyzes distance information obtained by the range image processor 103 and information obtained by the speed sensor 109; and permits the alarm apparatus 106 to generate an alarm or controls the operating apparatus 107 to encourage the driver to drive safely. The alarm apparatus 106 includes a sound generator and a vibration generator. The sound generator, for example, releases a sound through a loudspeaker to generate an alarm for the driver, while the vibration generator vibrates the driver's seat to generate an alarm for the driver.

Since this system is presented in order to provide an example application of the present invention, a detailed explanation will not be given for the system.

As described above, since the system employing the stereo image taking apparatus can integrate the image information, obtained by the stereo image taking apparatus 116 and the range image input apparatus 100, and vehicle information, obtained by various sensors, and since the image information is displayed on the display apparatus 108, an alarm is generated by the alarm apparatus 106 and the operating apparatus 107 is appropriately controlled, and the driver can be encouraged to drive safely.

When, for example, the vehicle approaches too closely an object to the front, information calling the driver's attention can be displayed, an alarm can be generated, or the operating apparatus 107 (e.g., a brake) can be controlled. The stereo image taking system can also be employed for scanning the median strip of the road for automated driving, or for viewing the area outside the vehicle to detect vehicles running in front and at the rear and obstacles and white lines on a road. In addition, the stereo image taking system can be employed as a sensor for detecting the posture and the directions the driver and a vehicle occupant are facing, so that whether the driver is looking away from the road while driving or is falling asleep can be determined, or it can be employed as a sensor to determine, once an air bag has begun to inflate, whether the target person is an adult or a child, or to determine the posture and the direction faced by the person, so that the air bag can be inflated safely.

The image forming optical system of the present invention and the image pickup apparatus employing this optical system can be employed not only for a vehicular mounted stereo image pickup system, but also can be employed, for example, for a camera for a robot, a railway, an airplane or a ship, for a surveillance camera, for a remote controlled conference system camera, or for other various uses.

What is claimed is:

1. An image forming optical system comprising a lens unit having a negative refractive power and a lens unit having a positive refractive power, which are arranged in order from an object side,
    wherein the lens unit having the negative refractive power comprises, in order from the object side, a first lens, which is a negative lens, and a second lens, which is a negative lens,
    wherein the lens unit having the positive refractive power comprises, in order from the object side, a third lens, which is a positive lens, a fourth lens, which is a negative lens, a fifth lens, which is a positive lens, and a sixth lens, which is a positive lens,
    wherein the second lens is a biconcave negative lens and the sixth lens is a biconvex positive lens, and
    wherein a total of six lenses are included in the image forming optical system.

2. An image forming optical system according to claim 1, wherein the second lens is a biconcave negative lens, and the following condition (6A) is satisfied $$6 \leq |r2f/f| \leq 200 \tag{6A}$$

where $r2f$ denotes a paraxial radius of curvature of an object side surface of the second lens, and f denotes a focal length of the entire image forming optical system.

3. An image forming optical system according to claim 1, wherein the following condition (7A) is satisfied:

$$1.2 \leq f3/f5 \leq 2.5 \tag{7A}$$

where f3 denotes a focal length of the third lens, and f5 denotes a focal length of the fifth lens.

4. An image forming optical system according to claim 1, wherein the following condition (8A) is satisfied:

$$1.5 \leq f45/f6 \leq 6 \tag{8A}$$

where f45 denotes a composite focal length of the fourth lens and the fifth lens, and f6 denotes a focal length of the sixth lens.

5. An image forming optical system according to claim 1, wherein the sixth lens is a biconvex positive lens, and the following condition (9A) is satisfied:

$$-0.8 \leq (r6f+r6r)/(r6f-r6r) \leq 0.8 \tag{9A}$$

where $r6f$ denotes a paraxial radius of curvature of an object side surface of the sixth lens, and $r6r$ denotes a paraxial radius of curvature of an image side surface of the sixth lens.

6. An image forming optical system according to claim 1, wherein an aperture stop is arranged between the third lens and the fourth lens.

7. An image forming optical system according to claim 1, wherein the fourth lens and the fifth lens are cemented together, surfaces where the fourth lens and the fifth lens are cemented have a negative refractive power, and an Abbe number of the fourth lens is smaller than an Abbe number of the fifth lens.

8. An image forming optical system according to claim 1, wherein the fourth lens and the fifth lens are cemented together, and the other lenses are arranged with air spaces between them; and a total of five lens components are included in the image forming optical system, where a lens component is defined as a single lens element or a cemented lens.

9. An image forming optical system according to claim 1, wherein a maximum half angle of view of the image forming optical system satisfies the following condition (10A):

$$80° \leq \omega \leq 105° \quad (10A)$$

where ω denotes the maximum half angle of view of the image forming optical system.

10. An image forming optical system according to claim 1, wherein the following condition (2A) is satisfied:

$$0.85 \leq f1/f2 \leq 1.5 \quad (2A)$$

where f1 denotes a focal length of the first lens, and f2 denotes a focal length of the second lens.

11. An image forming optical system according to claim 1, wherein the following condition (1A) is satisfied $$-1.2 \leq fN/Ih \leq -0.5 \quad (1A)$$

where fN denotes a focal length of the lens unit having the negative refractive power, and Ih denotes a maximum image height.

12. An image forming optical system according to claim 1, wherein the following condition (3A) is satisfied:

$$2.1 \leq f5/f \leq 4 \quad (3A)$$

where f5 denotes a focal length of the fifth lens, and f denotes a focal length of the entire image forming optical system.

13. An image forming optical system according to claim 1, wherein an aperture stop is arranged between the third lens and the fourth lens, and the following condition (4A) is satisfied:

$$0.7 \leq d3S/Ih \leq 2 \quad (4A)$$

where d3S denotes an axial space from an image side surface of the third lens to the aperture stop, and Ih denotes a maximum image height.

14. An image forming optical system according to claim 1, wherein the following condition (5A) is satisfied:

$$-0.35 \leq fN/fP \leq -0.1 \quad (5A)$$

where fN denotes a focal length of the lens unit having the negative refractive power, and fP denotes a focal length of the lens unit having the positive refractive power.

15. An image forming optical system according to claim 1, wherein the condition (11A) is satisfied:

$$0.7 \leq r1r/d1r \leq 1.5 \quad (11A)$$

where r1r denotes a paraxial radius of curvature of an image side surface of the first lens, and d1r denotes an axial space from the image side surface of the first lens 20 to the object side surface of the second lens.

16. An image forming optical system according to claim 1, wherein the first lens is a negative meniscus lens whose convex surface is directed toward the object side;

wherein the second lens is a biconcave negative lens, for which an absolute value of a paraxial radius of curvature of an image side surface is smaller than an absolute value of a paraxial radius of curvature of an object side surface;

wherein the third lens is a biconvex positive lens, for which an absolute value of a paraxial radius of curvature of an image side surface is smaller than an absolute value of a paraxial radius of curvature of an object side surface;

wherein the fourth lens is a negative lens, for which an absolute value of a paraxial radius of curvature of an image side surface is smaller than an absolute value of a paraxial radius of curvature of an object side surface;

wherein the fifth lens is a biconvex positive lens that is cemented to the fourth lens;

wherein the sixth lens is a biconvex lens; and wherein an aperture stop is arranged between the third lens and the fourth lens.

17. An image pick up apparatus comprising:

an image forming optical system according to claim 1, and an electronic image sensor, arranged on an image side of the image forming optical system, wherein the electronic image sensor includes a light receiving surface, and converts, into an electric signal, an optical image that is formed on the light receiving surface by the image forming optical system.

18. An image forming optical system comprising a lens unit having a negative refractive power and a lens unit having a positive refractive power, which are arranged in order from an object side, wherein the lens unit having the negative refractive power comprises, in order from the object side, a first lens, which is a negative lens and a second lens, which is a negative lens, wherein the lens unit having the positive refractive power comprises, in order from the object side, a third lens, which is a positive lens, a fourth lens, which is a negative lens, a fifth lens, which is a positive lens, and a sixth lens, which is a positive lens, and wherein the following conditions (IA) and (2A) are satisfied:

$$-1.2 \leq fN/Ih \leq -0.5 \quad (1A)$$

$$0.85 \leq f1/f2 \leq 1.5 \quad (2A)$$

where f1 denotes a focal length of the first lens, f2 denotes a focal length of the second lens, fN denotes a focal length of the lens unit having the negative refractive power, and Ih denotes a maximum image height.

19. An image forming optical system according to claim 18, wherein the second lens is a biconvex positive lens.

20. An image forming optical system according to claim 18, wherein a total of six lenses are included in the image forming optical system.

21. An image pick up apparatus comprising:

an image forming optical system according to claim 18, and an electronic image sensor, arranged on an image side of the image forming optical system, wherein the electronic image sensor includes a light receiving surface, and converts, into an electric signal, an optical image that is formed on the light receiving surface by the image forming optical system.

22. An image forming optical system comprising a lens unit having a negative refractive power and a lens unit having a positive refractive power, which are arranged in order from an object side, wherein the lens unit having the negative refractive power comprises, in order from the object side, a first lens, which is a negative lens, and a second lens, which is a negative lens, wherein the lens unit having the positive refractive power comprises, in order from the object side, a third lens, which is a positive lens, a fourth lens, which is a negative lens, a fifth lens, which is a positive lens, and a sixth lens, which is a positive lens, and wherein the following condition (3A) is satisfied:

$$2.1 \leq f5/f \leq 4 \tag{3A}$$

where f5 denotes a focal length of the fifth lens, and f denotes a focal length of the entire image forming optical system.

23. An image forming optical system according to claim 22, wherein a total of six lenses are included in the image forming optical system.

24. An image pick up apparatus comprising:
an image forming optical system according to claim 22, and
an electronic image sensor, arranged on an image side of the image forming optical system,
wherein the electronic image sensor includes a light receiving surface, and converts, into an electric signal, an optical image that is formed on the light receiving surface by the image forming optical system.

25. An image forming optical system comprising a lens unit having a negative refractive power and a lens unit having a positive refractive power, which are arranged in order from an object side,
wherein the lens unit having the negative refractive power comprises, in order from an object side, a first lens, which is a negative lens, and a second lens, which is a negative lens,
wherein the lens unit having the positive refractive power comprises, in order from the object side, a third lens, which is a positive lens, a fourth lens, which is a negative lens, a fifth lens, which is a positive lens, and a sixth lens, which is a positive lens, and an aperture stop that is located between the third lens and the fourth lens, and
wherein the following condition (4A) is satisfied:

$$0.7 \leq d3S/Ih \leq 2 \tag{4A}$$

where d3S denotes an axial space from an image side surface of the third lens to the aperture stop, and Ih denotes a maximum image height.

26. An image forming optical system according to claim 25, herein a total of six lenses are included in the image forming optical system.

27. An image pick up apparatus comprising:
an image forming optical system according to claim 25, and
an electronic image sensor, arranged on an image side of the image forming optical system,
wherein the electronic image sensor includes a light receiving surface, and converts, into an electric signal, an optical image that is formed on the light receiving surface by the image forming optical system.

28. An image forming optical system comprising a lens unit having a negative refractive power and a lens unit having a positive refractive power, which are arranged in order from an object side,
wherein the lens unit having the negative refractive power comprises, in order from the object side, a first lens, which is a negative lens, and a second lens, which is a negative lens,
wherein the lens unit having the positive refractive power comprises, in order from the object side, a third lens, which is a positive lens, a fourth lens, which is a negative lens, a fifth lens, which is a positive lens, and a sixth lens, which is a positive lens, and
wherein the following condition (5A) is satisfied:

$$-0.35 \leq fN/fP \leq -0.1 \tag{5A}$$

where fN denotes a focal length of the lens unit having the negative refractive power, and fP is a focal length of the lens unit having the positive refractive power.

29. An image forming optical system according to claim 28, wherein a total of six lenses are included in the image forming optical system.

30. An image pick up apparatus comprising:
an image forming optical system according to claim 28, and
an electronic image sensor, arranged on an image side of the image forming optical system,
wherein the electronic image sensor includes a light receiving surface, and converts, into an electric signal, an optical image that is formed on the light receiving surface by the image forming optical system.

31. An image forming optical system comprising a lens unit having a negative refractive power and a lens unit having a positive refractive power, which are arranged in order from an object side,
wherein the lens unit having the negative refractive power comprises, in order from the object side, a first lens, which is a negative lens, and a second lens, which is a negative lens,
wherein the lens unit having the positive refractive power comprises, in order from the object side, a third lens, which is a positive lens, a fourth lens, which is a negative lens, a fifth lens, which is a positive lens, and a sixth lens, which is a positive lens,
wherein the second lens is a biconcave negative lens and the sixth lens is a biconvex positive lens, and
wherein an aperture stop is arranged between the third lens and the fourth lens.

* * * * *

UNITED STATES PATENT AND TRADEMARK OFFICE
CERTIFICATE OF CORRECTION

PATENT NO.      : 7,633,688 B2
APPLICATION NO. : 11/442154
DATED           : December 15, 2009
INVENTOR(S)     : Yuji Kamo Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 673 days.

Signed and Sealed this

Ninth Day of November, 2010

David J. Kappos
*Director of the United States Patent and Trademark Office*